United States Patent [19]

Thoms

[11] Patent Number: 4,642,463

[45] Date of Patent: Feb. 10, 1987

[54] INTELLIGENT RADIATION MONITOR

[76] Inventor: William H. Thoms, 4401 Lee Hwy., Arlington, Va. 22207

[21] Appl. No.: 690,547

[22] Filed: Jan. 11, 1985

[51] Int. Cl.$^4$ ............................................. G01T 1/17
[52] U.S. Cl. ................................. 250/336.1; 364/414
[58] Field of Search ................ 250/388, 370 J, 370 F, 250/336.1; 364/527, 414

[56] References Cited

U.S. PATENT DOCUMENTS

| | | | |
|---|---|---|---|
| 2,844,312 | 7/1958 | McCampbell | 364/414 |
| 3,878,496 | 4/1975 | Erickson | 250/336.1 |
| 3,984,690 | 10/1976 | Marshall, III et al. | 250/374 |
| 4,103,164 | 7/1978 | East | 250/374 |
| 4,105,918 | 8/1978 | Miyagawa et al. | 250/337 |
| 4,284,892 | 8/1981 | Hulot et al. | 250/388 |
| 4,301,367 | 11/1981 | Hsu | 250/370 F |
| 4,320,393 | 3/1982 | Engdahl | 340/600 |
| 4,415,237 | 11/1983 | Fox | 250/370 |
| 4,428,050 | 1/1984 | Pellegrino et al. | 364/414 |
| 4,480,311 | 10/1984 | Mastain et al. | 364/527 |

OTHER PUBLICATIONS

*Canadian Astronautics Limited*, product information on Solid State Ionizing Radiation Dosimeter Model SID 200, Ottawa, Ontario, Canada (Apr. 1983).

*Dosimeter Corporation*, product information on Super DAD ®, Digital Alarm Dosimeter Models 1888 and 1888Sv, Cincinnati, OH, (Jan. 1983).

*Panasonic*, (Matsushita Electric Trading Co., Ltd.), product information on Pocketable Dosimeter with Alarm Function Model ZP-120-01P, Osaka, Japan.

*Technical Associates*, product information on Alarming Pocket Digital Dosemeter with Memory Models PDR-1b and PDR-1c, Canoga Park, CA.

*Primary Examiner*—Janice A. Howell
*Assistant Examiner*—Constantine Hannaher
*Attorney, Agent, or Firm*—Pollock, Vande Sande & Priddy

[57] ABSTRACT

An intelligent radiation monitor is disclosed which includes, as major components, a radiation detector (for detecting real time radiation rate), a digital processor and a display. The digital processor includes intelligence to perform several useful, and novel, functions. The digital processor is responsive to externally input information corresponding to alarm radiation rate, alarm radiation dose and alarm time-to-go. The digital processor integrates the perceived real time radiation rate to produce total dose information. The processor can then compare total dose information to alarm dose, compare sensed radiation rates to alarm rate and compute time-to-go, by dividing the difference between alarm dose and total dose by the present radiation rate, and finally comparing computed time-to-go to alarm time to go. The processor initiates an alarm condition for alerting the user of sensed radiation rate exceeds alarm radiation rate, if total dose information exceeds alarm dose information or if time-to-go, as computed, is less than alarm time-to-go information. Additional novel functions performed include determination of expected dose, first opportunity computations and decay time-to-go computations. In all these computations the processor is capable of extrapolating predicted radiation rates.

22 Claims, 29 Drawing Figures

INTELLIGENT RADIATION MONITOR

DESCRIPTION

1. Technical Field

The present invention relates to an improved radiation monitor, and more particularly, a device for measuring and indicating radiation rate and total radiation dose along with several other quantities which are produced by computations using the measured quantities.

2. Background Art

Monitoring radiation levels is a field of interest in two different environments. In the nuclear power industry, the exposure of people to background radiation must be monitored in order to protect their health. In normal operation, this problem has been solved with relatively simple and inexpensive devices. In other, extraordinary situations such as in the case of a radiation leak which requires clean-up operations, the individuals exposed to radiation levels during these clean-up operations must also have their exposure monitored. This latter situation presents more complex problems because the radiation levels to be encountered are not easily predicted, and these levels are typically higher than those encountered in the more normal situation. The higher radiation levels mean that an individual's exposure can rapidly approach safe limits and therefore it is important to have a device capable of indicating radiation dose as well as radiation rate in real time. This is a particular application for which the invention has been designed.

In an entirely different context, radiation monitoring, under more severe radiation levels, could be contemplated in the event of a nuclear attack or the accidental detonation of nuclear weapons. In this context, the radiation levels are many times higher than would be encountered in the nuclear power industry. Thus the ability to provide an individual with a real time indication of his total radiation dose as well as the radiation rate to which he is being subjected is even more important.

The prior art indicates approaches to this problem, see for example Erickson U.S. Pat. No. 3,878,496; Marshall, III et al U.S. Pat. No. 3,984,690; East U.S. Pat. No. 4,103,164; Miyagawa et al U.S. Pat. No. 4,105,918; Hulot et al U.S. Pat. No. 4,284,892; Engdhal U.S. Pat. No. 4,320,393; Fox U.S. Pat. No. 4,415,237 and Mastain U.S. Pat. No. 4,480,311. In general these devices describe dosimeters or radiation monitors which may be portable, and which can integrate the radiation rate so as to provide a total radiation dose. In some cases the user can preset a selected dose level, and the device will provide some warning when that selected dose level has been exceeded.

Devices actually marketed including some or all of the functions described in the aforementioned patents (although not necessarily in a portable device) include the Technical Associates Model PDR-1b and PDR-1c; Canadian Astronautics Ltd. Model SID 200; Panasonic Model ZP-120-01P and Dosimeter Corp.'s Super Dad.

This and other similar prior art fails to meet the needs of potential users for a number of reasons.

It may be inadequate to provide a user with an indication that he has exceeded the preselected radiation dose. It may for example be impossible for the user to immediately extricate himself from the radiation-producing environment, and therefore the alarm comes too late for him to maintain his dose below the selected level. Thus, in accordance with one feature of the invention, a radiation monitor is provided which, when it is provided with information indicating the user's maximum desired dose, will indicate to the user the time-to-go to reach that dose at the present rate of exposure. In some circumstances (e.g. fallout) the radiation rate may not be constant, and typically is decaying, exponentially. Thus, in accordance with another feature of the invention the device extrapolates, based on some predetermined decay rate, to provide the user with a realistic indication of the time-to-go before reaching the user-selected alarm dose.

It is another feature of the invention that the device, when maintained on a particular user's person, continually integrates the radiation exposure rate to which the user has been subjected, so that the user's dose level which is displayed is a realistic indication of the user's dose. While the device provides the user with the ability to manipulate the data monitored, it prevents him from resetting or zeroing the dose. It is another important feature of the invention that the device is miniaturized so that it can be conveniently carried with the user without interfering with normal operation. It is another feature of the invention that the device includes an electronic interface port so that it may, at times, be "read" at some central facility to maintain records of the dose to which various users have been subjected.

In addition to providing the user with an indication of the time-to-go to reach a selected dose level, the device will also accept alarm levels for rate, dose and time-to-go. The device will continually monitor the radiation rate with respect to the alarm rate, and provide the user with a perceptible signal in the event that the present radiation rate exceeds the alarm rate. Likewise, the user can set an alarm dose (typically below the dose limit) and a perceptible signal is provided in the event the total dose exceeds the alarm dose. Likewise, the user can set in a time-to-go alarm to provide a perceptible signal in the event the time-to-go decreases below the alarm time-to-go.

In many situations involving a nuclear explosion, it is contemplated that a user will subject himself to higher radiation rates than those to which he would be exposed in some shelter. The user may for example predict that radiation rate outside a shelter may be at a given level and he would be interested in how long he could subject himself to that particular level without exceeding a predictable selected alarm dose. Based on user input parameters, as well as the total dose to which the user has already been subjected to, the device can manifest to the user how long he can subject himself to the higher radiation rate without exceeding his dose alarm level. In accordance with the invention, this computation takes into account the expected rate of radiation decay. On the other hand, if a required task is predicted to take a given length of time, a user may be interested in determining what expected dose he may receive if he is subjected, for that period of time, to some given radiation rate. Under these circumstances, the device calculates and manifests to the user the resulting dose that he will be subjected to, and this computation also takes into account predicted radiation decay.

In a third variation, the user may be constrained by some particular task duration and some particular radiation rate and dose limit. These conditions may prevent the user from engaging in the task immediately, but rather the user is interested in learning how long he must wait, to allow present radiation levels to decay sufficiently so that at a future time the predicted radiation rate, dose limit and task duration constraints can be simultaneously satisfied. Under these circumstances therefore, the device manifests to the user a delay time or first opportunity for performing the task, taking into account the present circumstances of the user's present dose.

SUMMARY OF THE INVENTION

The invention meets these and other objects by providing a device including a radiation monitor, producing information respecting the present radiation rate to which the monitor is subjected. A digital processor (for example a microprocessor) is arranged to be responsive to the output of the radiation monitor. A display is provided which interfaces with the digital processor so as to provide manifestations to the user of detected and calculated information. The radiation monitor can employ a wide variety of presently available devices. Typically, the monitor device counts events over some time base, and periodically provides to the digital processor a total count for the time period. Based on the total count, and the time period, the digital processor can compute a rate. In addition, by adding the count, or a scaled version of the count, to a previously accumulated count, a new accumulated total is derived which indicates the total dose to which the instrument has been subjected. The display allows this information to be manifested to the user.

The digital processor includes a suitable program and scratch pad memory to allow one or more computations to be performed on the foregoing data and to provide output in one or more forms. To this end, an alarm may be included which is controlled by the digital processor, the alarm providing for an audible or other perceptible warning, when energized.

In order to provide the user with time-to-go information, the processor requires dose limit information. With dose limit information, the digital processor can determine the present difference between total dose and dose limit. This difference, when divided by the current rate value, provides time-to-go information, which can be displayed singly, or along with rate and/or total dose.

In one embodiment of the invention, the device also includes a user-operated keyboard and associated decoder and buffer. The digital processor is responsive to dose limit information coupled through the keyboard. In another embodiment of the invention, an electrical interface port is used for communication with external digital devices, and dose limit information can be transferred via the electrical interface port. The same interface port may also transmit to the device alarm levels and allied information, e.g. rate of decay, and in turn receive information (ID #, dose) from the device.

In addition to computing time-to-go information based on dose limit information, the device is also responsive to alarm rate information, alarm dose information and alarm time-to-go information. This information can be provided, in one embodiment of the invention through a keyboard, and in another embodiment of the invention through the interface port. Regardless of the manner in which the information is provided, the device essentially continuously compares present rate with alarm rate, and may manifest to the user an incident in which present rate exceeds the alarm rate. This manifestation can be through the alarm and/or through the particular condition of the display (flashing). In a similar fashion, the device essentially continuously compares dose alarm with total dose information and again manifests to the user any incident in which the total dose information exceeds alarm dose information. Finally, the device also essentially continuously compares time-to-go information with alarm time-to-go information and provides the same character of manifestation to the user in the event the alarm time-to-go information is less than the present time-to-go information. In a preferred embodiment, the flashing display identifies the item which triggered the alarm. If more than one event triggered the alarm, a hierarchy is consulted to determine which item is to be flashed. The hierarchy is dose violation, time-to-go violation and rate violation.

For the purpose of predicting or extrapolating radiation decay information, the user indicates to the device (typically through the keyboard) the time period which has elapsed since a nuclear explosion which is the source of the radiation. Thereafter the device increments elasped time. Based on current elapsed time information, the device can thereafter predict, from present radiation rate levels, future radiation rate levels, and those predicted radiation rate levels can be used in providing various forms of information to the user.

The device for example can calculate decayed time-to-go. Decayed time-to-go depends partly on the user's present dose level, and a user-selected dose limit. From this information, the device determines the dose still available to the user before reaching the dose limit. The user may also input an expected radiation rate, which will typically not be the radiation rate to which the user is continually exposed, but may be some higher radiation rate level such as that which may be encountered outside a shelter. Based on the expected rate, the predicted decay rate and the available dose, the device can determine a decay time-to-go as that time during which the user can be subjected to the outside radiation rate before reaching his dose limit.

Another form of information can be provided to the user in the event that he wishes to determine the total dose to which he would be subjected if he exposed himself to a higher than normal radiation rate to perform a particular task, the duration of which he can predetermine. To effect this computation, the task duration and expected rate are provided as inputs by the user. The device can then determine, taking into account the user's present dose, the user's expected radiation rate and predicted radiation rate decay, the resulting dose to which the user would have been subjected had he performed the particular task.

In another variation, the user may have determined or assumed that performing a particular task (of predetermined duration) at a present expected radiation rate, taking into account radiation rate decay and the user's present dose, that any reasonable dose limit would be exceeded. Rather, under these circumstances, what the user is interested in is determining how long he must delay before he has the first opportunity to perform the particular task. Based on the information presented to it by the user (present predicted radiation rate levels, task duration) and information presently available (the user's total dose), a computation is performed to determine a future time delay, at the expiration of which the task can be performed in the then existing (predicted) radiation rate levels, for the predetermined task duration, without exceeding the user's dose limit.

The invention thus provides a personal radiation monitor comprising:

a radiation detector producing rate information related to real time radiation exposure rate to which said radiation detector is exposed, a digital processor responsive to said radiation detector for integrating said rate information to maintain total dose information, output means responsive to information provided by said digital processor for providing a manifestation of at least said rate and total dose information, said digital processor including:

first means for comparing said total dose information to dose limit information to produce dose-to-go information related to the difference between said total dose information and the dose limit information, second means for dividing said dose-to-go information by said rate information to produce time-to-go information related to time-to-go for the user to reach said dose limit, and third means for controlling said output means for providing a manifestation of said time-to-go information.

The invention also provides a personal radiation monitor comprising:

a radiation detector producing rate information related to real time radiation exposure rate to which said radiation detector is exposed, a digital processor responsive to said radiation detector for integrating said rate information to maintain total dose information, output means responsive to output information provided by said digital processor for providing a manifestation of at least said rate and total dose information, and wherein said digital processor includes first means for extrapolating, from selected rate information, to determine predicted radiation exposure rate information for a selected time in the future.

The invention also provides a personal radiation monitor comprising:

a radiation detector producing rate information related to real time radiation exposure rate to which said radiation detector is exposed, a digital processor responsive to said radiation detector for integrating said rate information to maintain total dose information, output means responsive to information provided by said digital processor for providing a manifestation of at least said rate and total dose information, said digital processor further including:

first means for extrapolating, from selected rate information, to determine predicted radiation exposure rate information, second means for determining from selected time duration information, alarm dose information and said predicted radiation exposure rate information, a time quantity identifying that time in the future that a user of said monitor can endure said predicted radiation exposure rate for said time duration without exceeding a radiation dose corresponding to said alarm dose information.

BRIEF DESCRIPTION OF THE DRAWINGS

The present invention will now be further described in the following portion of this specification when taken in conjunction with the attached drawings in which like reference characters identify like apparatus and in which.

DETAILED DESCRIPTION OF PREFERRED EMBODIMENTS

Figure 1:
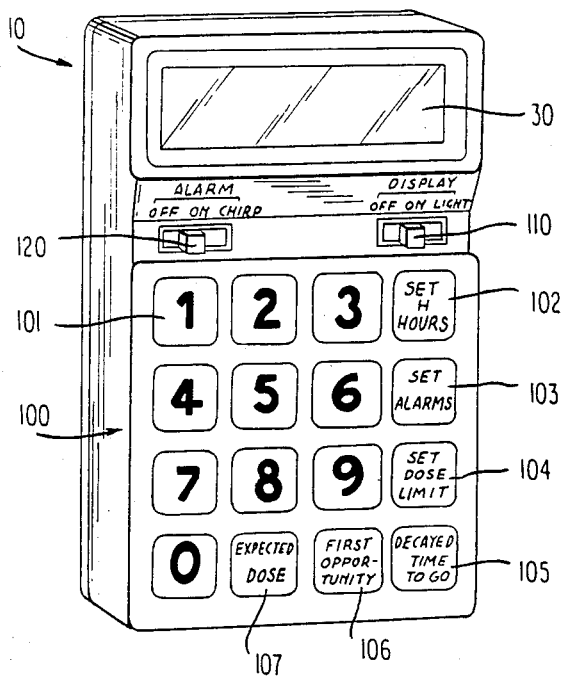
FIG. 1 illustrates one embodiment of the invention.
Figure 2:
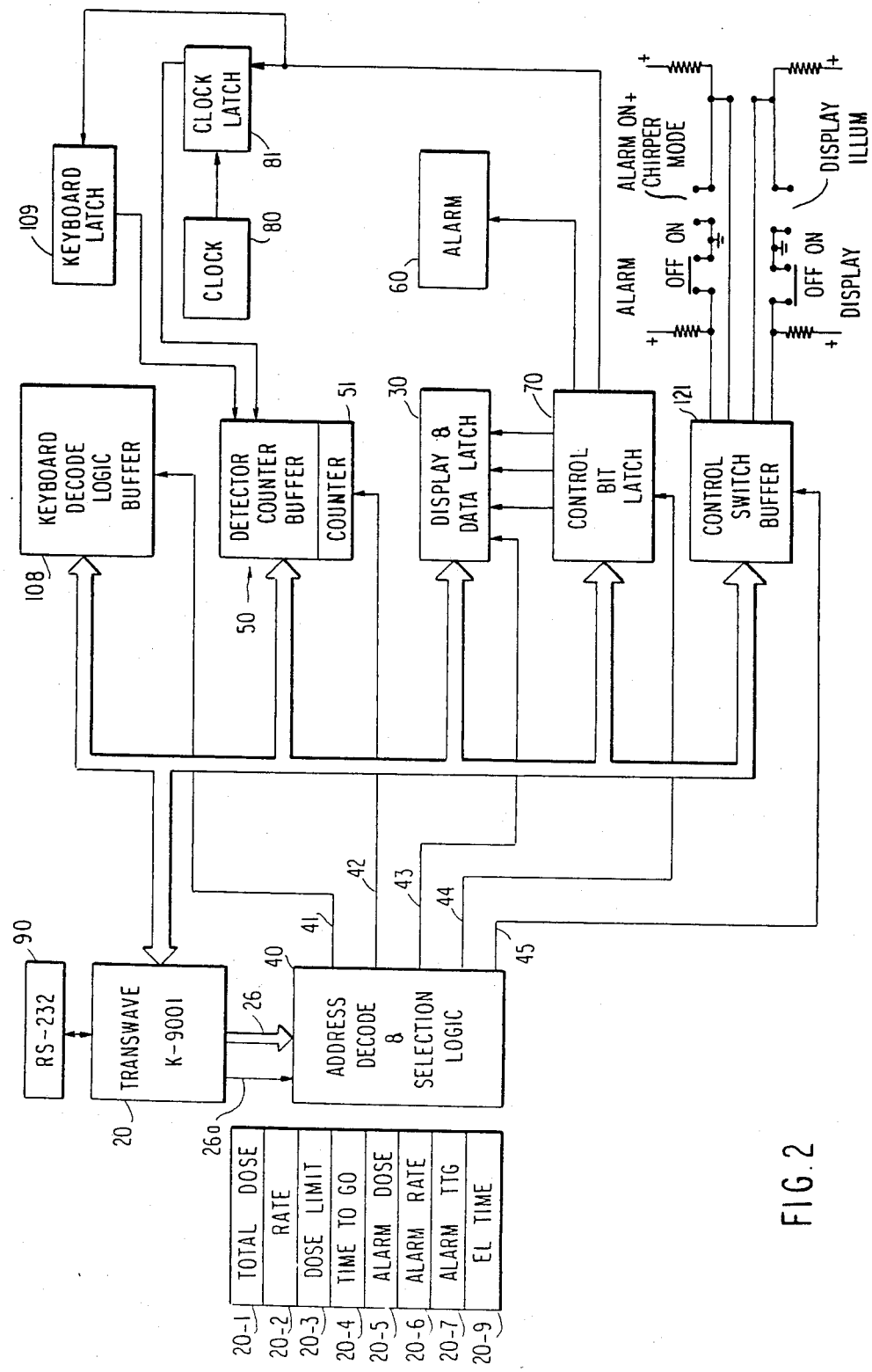
FIG. 2 is a block diagram illustrating the cooperation of various components of the invention.

FIG. 1 illustrates the outward appearance of one embodiment of the invention comprising a personal radiation monitor 10. The significant elements apparent to the user are a 16-element keyboard 100 (16 keys including numerical keys 101 and function keys 102–107), an alpha-numeric display 30 and two 3-position switches, a switch 110 which in one position disables the display, in an intermediate position enables the display and in a third position brightens the display, and a second 3-position switch 120 for controlling the alarm, in one position the alarm is disabled, and two positions to control two different alarm modes. In a first mode the alarm sounds a tone if an alarm limit is violated. In a second mode the alarm, in addition, beeps at a rate related to perceived radiation rate. Using conventional integrated electronics, the device 10 can be made pocket-sized and include a convenient clip (not illustrated) for fastening to a shirt pocket, belt, etc. Before describing typical usage of the device 10, reference is made to FIG. 2 to show a high level block diagram of the components. FIG. 2 expressly shows the display 30.

The keyboard 100 is associated with the keyboard decode, logic, buffer element 108 and latch 109. This element, as is conventional in the art, decodes the condition of the keyboard and buffers that information for use by other elements. In general when a particular key is depressed a code is generated identifying the particular key which is depressed. Not illustrated in FIG. 1, but contained within device 10, is a conventional radiation detector which is associated with the detector 10 or buffer element 50. The detector may for example be a conventional cadmium telluride detector, and in a preferred embodiment such a detector provided by Radiation Monitoring Devices is employed (see in general "Use of a Cadmium Telluride Detector in a New Tiny Personal Radiation Chirper" by Wolf et al appearing in the *IEEE Transactions on Nuclear Science*, Vol. NS-26, No. 1, February 1979 at pages 777 et seq). The element 50 includes in addition to the detector itself and its associated electronics, a counter 51 which is incremented by signals output by the detector. As will be described, this counter is read and the dose accumulated over the sample period is calculated by comparing the counter value with the previous counter value. A clock 80 sets a clock latch 81. Reference to latch 81 can be made to determine that a sample period has expired. In that event the radiation counter 51 is read and the clock latch 81 is reset.

Coordinating the elements of FIG. 2 is a digital processor 20, which in an embodiment actually constructed was a Transwave K-9001. Digital processor 20 has an address bus 26 and synch pulse 26a which are connected to an address decoder selection logic 40. On the presentation of selected addresses, the selection logic 40 provides selection signals 41-45, selection signal 41 enables sampling of the keyboard element 108, selection signal 42 enables the detector counter buffer 50 to be sampled, selection signal 43 enables the display 30 to respond to information presented to it, selection signal 44 enables a control bit latch 70 and selection signal 45 enables the control switch buffer 121. The elements just referred to are interconnected with the digital processor 20 via a data bus 25 for bidirectional transfer of data. Of course, in general keyboard data flows to the digital processor 20, radiation rate counts flow from the detector counter buffer element 50 to the digital processor 20, information for the display 30 flows from the digital processor 20 to the display, alarm control data flows from switch 121 to processor 20, and control bit latch 70 responds to information presented by the digital processor 20 over the data bus 25. The control bit latch 70 also controls the enabled or disabled condition of an alarm 60 producing an audible signal. In general, control bit latch 70 is used to generate chip select and write signals to display 30. The display data latch holds the data to be written. Data may include characters, flash commands, etc. The control bit latch 70 may also provide for resetting the latches 109 and 81.

The digital processor 20 maintains RAM registers for total dose information 20-1, radiation rate information 20-2, dose limit information 20-3, time-to-go information 20-4, alarm dose information (ADOSE) 20-5, alarm rate information (ARATE) 20-6, alarm time-to-go information (ATTG) 20-7, and elapsed time information (ELTIME) 20-9. Of these elements, the first two are maintained continuously whether there is any operator input or not. Operator input is required to provide the dose limit information, and this information is necessary for calculation of time-to-go information. The operator also provides the alarm dose, alarm rate and alarm time-to-go information and in that event the alarm can be energized in the event any of the alarm conditions are violated (rate or total dose above alarm rate or alarm dose, or alarm time-to-go less than time-to-go). The last element also represents operator input to enable prediction of future, decayed radiation rates. Operator inputs ELTIME once, the processor maintains it current, as will be described.

Figure 4:
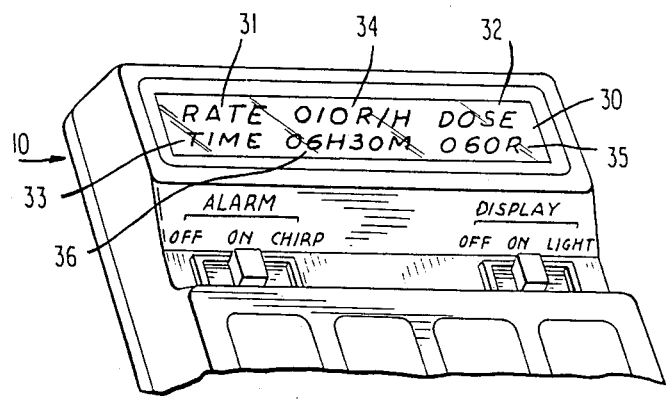
FIGS. 4, 5A, 5B, 6A-6E, 7A, 7B, 8A-8C, 9A, 9B and 10A-10E illustrate information provided by the display 30 (of FIG. 2) under various circumstances of use.

FIG. 4 shows the default display (that display which is provided in the absence of some other, special purpose, display). This display includes header information 31, 32 and 33, for the three different categories of information. In addition, 34, 35, 36, FIG. 4 represents typical information being displayed indicating that the present radiation rate is 10 Roentgens (R) per hour, the total dose to date is 60 R, and the time-to-go (to reach a user-selected dose limit) is 6 hours and 30 minutes. In the event the user has not selected a dose limit, then the field 36 would indicate that the unit was "not set".

Figure 5B:
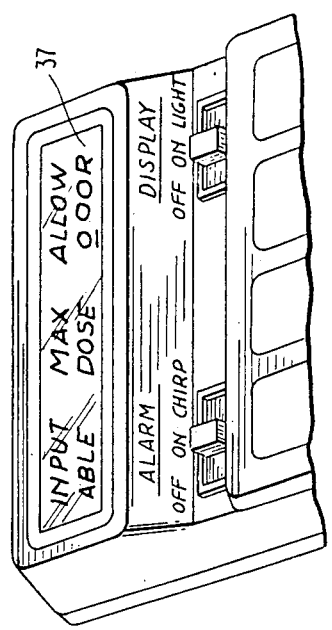
Figure 5A:
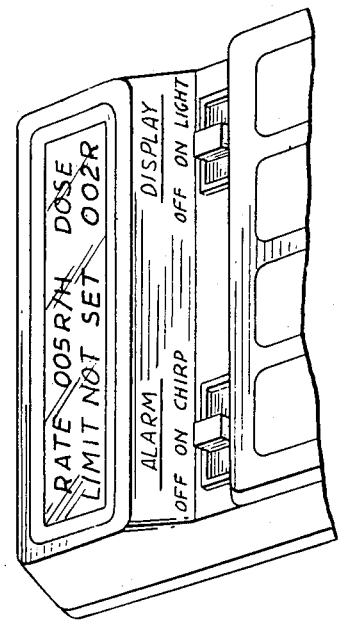

FIGS. 5A and 5B indicate respectively a typical display in the event the dose limit is not set and the prompt to the user after he has selected the function to set the dose limit. More particularly, when the user is presented with a display such as that shown in FIG. 5A, it indicates to him that he has not set the dose limit. Therefore, if the user desired to set the dose limit, he would press function key 104 (see FIG. 1). The resulting display would be shown in FIG. 5B, prompting the user to select a particular dose limit. This selection is made by the use of a numerical keypad consisting of keys 101 (for the numerical characters 0-9). As a user keys in his dose limit, it is displayed in the field 37 and also stored in the RAM register 20-3 (see FIG. 2). Once the dose limit is selected, then the display will take the form shown in FIG. 4.

Figure 6B:
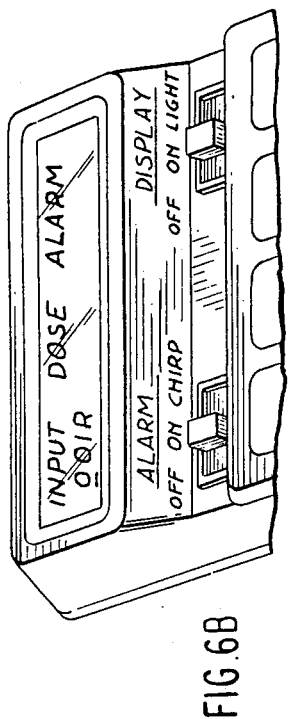
Figure 6E:
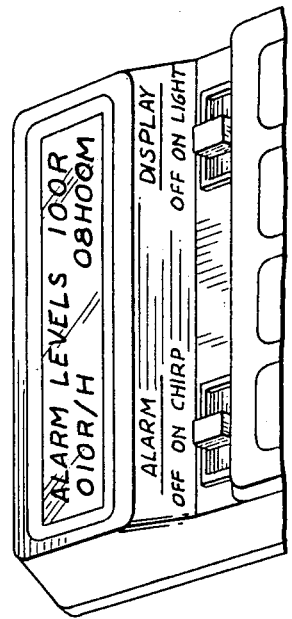
Figure 6C:
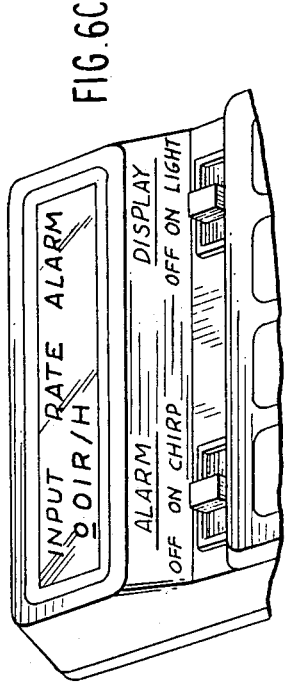
Figure 6A:
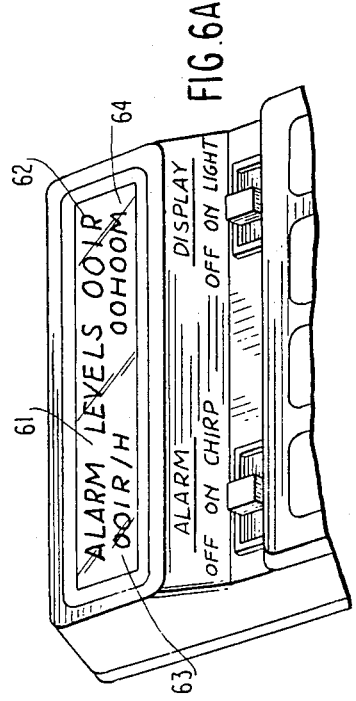
Figure 6D:
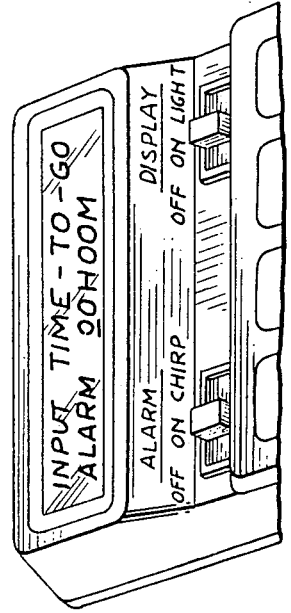

In the event the user wishes to set alarm levels, he manipulates the set alarm function key 103 (see FIG. 1). Upon this operation the display reverts to FIG. 6A. This display includes four fields, a header field 61 (alarm levels) and a field for each of the alarm parameters, alarm dose 62, alarm rate 63 and alarm time-to-go 64. Prior to having set the alarms, the fields contained default alarms. For example 1 R/hr and 1 R for rate and dose alarms and no time for TTG alarm. Obviously, other default alarms can be selected. After this display has been presented the user may rekey the alarm set function key 103 and the display automatically switches to that shown in FIG. 6B where the user is prompted to input the dose alarm level. This information is input again using the numerical keypad comprising keys 101. As he enters the dose alarm, it is displayed in the indicated field of FIG. 6B. Once the dose alarm is set and the user again keys function key 103, the display changes to that of FIG. 6C when the user is prompted to input dose rate alarm. The same procedure is followed and when the information has been provided by the user, the display switches (after keying 103) to that shown in FIG. 6D. This display prompts the user to enter the time-to-go alarm information. Finally, when all alarm levels have been entered, the display switches to that shown in FIG. 6E to allow the user to review the alarm levels that he has set. If he is satisfied with them he can again depress the set alarm key 103 and the values are entered and the default display returns. If he is dissatisfied, he may repeat the procedure to change the alarm levels.

Figure 7B:
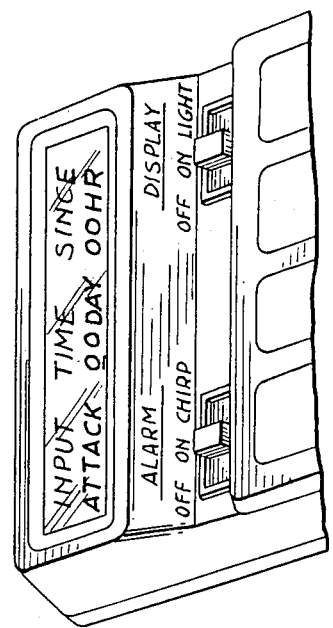
Figure 7A:
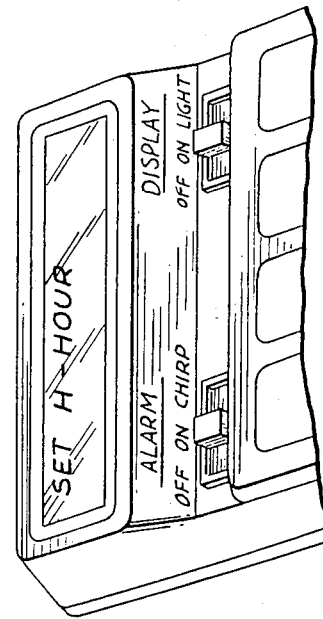

For certain procedures, the personal radiation detector requires an indication of elapsed time since an event which triggered the release of radiation. With this information the device can predict future radiation rate information. If the user decides to employ this feature, he will be prompted to set H-hour by the display shown in FIG. 7A. Thereafter he manipulates function key 102 to indicate that he will be setting this information. As a result of this manipulation, the display switches to that shown in FIG. 7B. At this point, he can manipulate the numerical keypad (consisting of keys 101) to input the elapsed time since the event. This allows the processor to maintain a current value for elapsed time. Knowing the elapsed time, and the present radiation rate, or an input radiation rate, the device 10 extrapolates to predict future radiation rates.

One function employing the predictive feature is that of predicting decayed time-to-go.

Figure 8B:
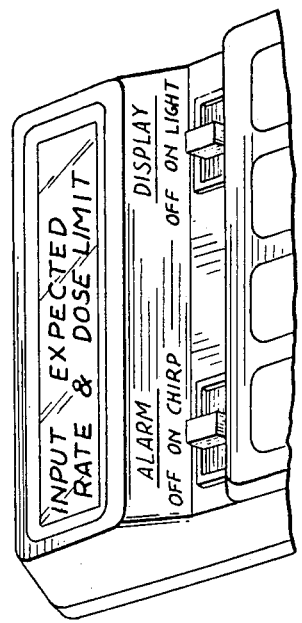
Figure 8C:
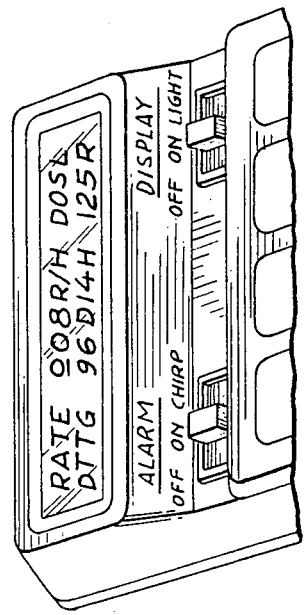

This is particularly attractive when evaluating long-term exposure options, or calculating exposure soon after an attack, both situations in which radioactive decay may be a driving factor. In this mode information is derived respecting the time-to-go to reach the maximum allowable dose taking into account the user's present dose, the present radiation rate (or a selected radiation rate) and the manner in which whichever rate is chosen will decay as a function of time. When the user desires to use this function, he manipulates function key 105 (see FIG. 1). This produces the display shown in FIG. 8A. The display of FIG. 8A indicates a time in the future at which a particular dose alarm will be reached based on extrapolating currently sensed radiation rate where the prediction uses a decay function determined by the current value of elapsed time. If the user desires the decayed time-to-go prediction to be based on different parameters, he may manipulate the function key 105 to produce the display of FIG. 8B. He may now input the desired parameters. This information is again entered using the numerical keys 101 of the keyboard 100. Once this information is entered, and the computation completes, the display shown in FIG. 8C is provided. This shows both the selected rate (present time—either that rate being presently monitored or a user-selected rate) and the selected dose limit as well as the decay time-to-go.

Figure 9B:
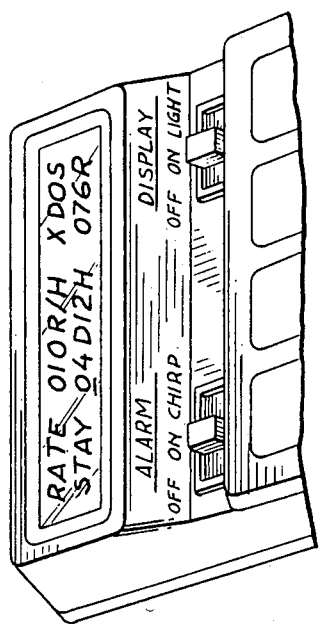
Figure 9A:
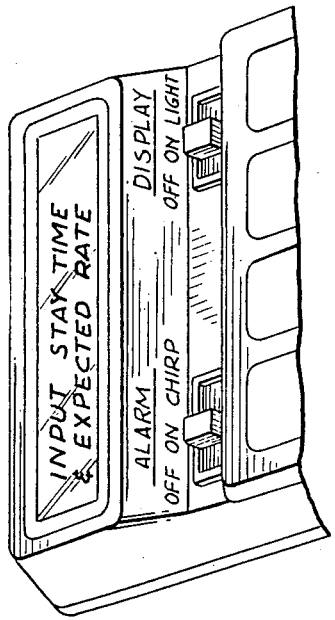

Another function which employs the capability of predicting future radiation rates based on radioactive decay is for calculating expected dose over a specified length of time, using either the current sensed rate or a user-selected rate as the basis for the calculation. To employ this function, the user manipulates function key 107, and this produces the display shown in FIG. 9A prompting the user to enter stay time and expected rate. The display initializes to the current sensed rate with the input cursor positioned at the stay time field and as a result of the input information, as well as present information, the display shown in FIG. 9B is produced. In this display the stay time and rate are selected stay time (entered by the user) and either a selected rate or the current sensed rate. The header XDOS identifies the expected dose.

Figure 10B:
Figure 10E:
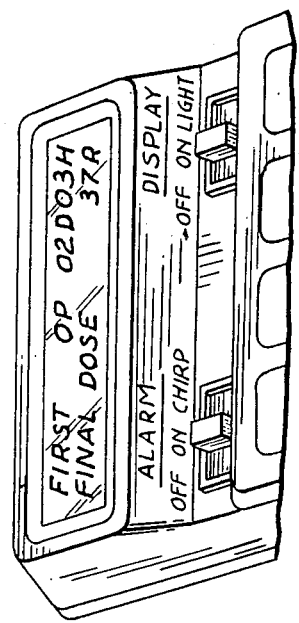
Figure 10C:
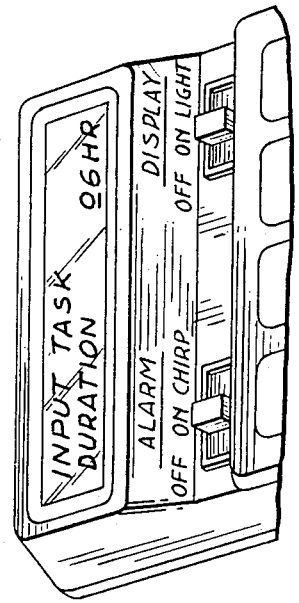
Figure 10A:
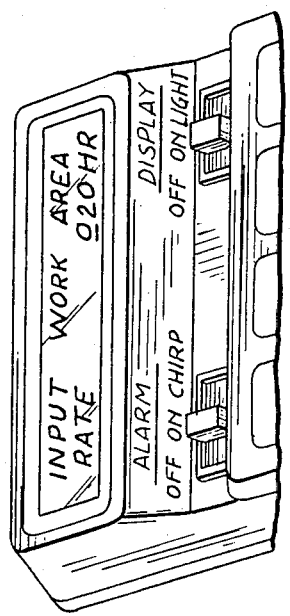
Figure 10D:
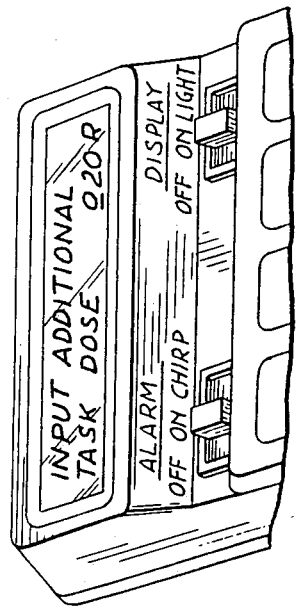

Finally, under certain circumstances the user desires to perform a specified task, consuming a specified amount of time, but is aware (in some fashion) that the radiation levels at the location of this task (considering the task duration) will result in a total dose exceeding what the user finds acceptable. For example, as a result of the expected dose function, he may determine that the expected dose exceeds what he is willing to accept. Therefore, the user would manipulate the first opportunity (FOP) function key 106. The FOP function takes into account two rates (shelter or waiting rate and work or task rate), the task duration, the user's present dose, and the acceptable additional dose for the task to determine when (in the future) the task can be performed without exceeding the acceptable additional dose, and the total dose, i.e. at the conclusion of the task, including the user's current dose, the dose to be accumulated while waiting to start the task, and the dose accumulated during the task. More particularly, if the task is performed immediately the task rate may be so high that the final dose exceeds user acceptable levels. Delaying the beginning of the tasks has positive and negative effects. On the positive side the task rate will (in the future) have decayed. On the other hand, during the delay, the user will be accumulating a dose from the shelter (at a decaying rate as well). These constraints are balanced by finding the earliest opportunity (FOP) in which the constraints can be satisfied. Operation of the FOP key 106 produces the display shown in FIG. 10A. This prompts the user to enter the current work (or task) rate. The display initializes to the current sensed rate. If the user is located at the site he will perform the task, the sensed rate is the current work area rate and he may proceed to the next display. The next display, shown in FIG. 10B is provided prompting the user to enter the expected shelter rate. Again, the display initializes to the current sensed rate. If the user is located in the area (presumably a shelter of some type) where he will wait until performing the task, this is the shelter rate and he may proceed to the next display. Displays of FIGS. 10C and 10D prompt the user to input task duration and acceptable additional (task) dose, respectively. When input to this latter display is completed, the first opportunity function is performed. A future time is identified as the first opportunity, for example as shown in FIG. 10E, 2 days and 3 hours from the present time. This first opportunity indicates to the user that if he waits 2 days and 3 hours, he can perform the required task at the then-existing radiation levels and the additional acceptable dose will not be exceeded. Furthermore, as shown in FIG. 10E, his total dose upon completion of the task will be 37 R.

The processing to produce the described results has been written in TINY BASIC, and is reproduced in the Appendix. Those skilled in the art will appreciate that the processing can be written in any number of available languages and the BASIC program is merely an illustration.

The program of Appendix A is broken down into a number of modules, the main loop (PWPINT) extends from lines 2 through 39, inclusive. An executive routine is run when a new interrupt is detected, and the executive extends from lines 90 through 96 inclusive. The key interrupt processing routine extends from lines 100 through 110. Processing a clock interrupt as well as the display control extends from lines 120 through 198. The routines for the expected dose function extend from lines 300 through 350. The first opportunity function processing extends from lines 400 through 455. Processing to set H-hour extends from lines 500 through 534. The alarm setting functions exterid from lines 600 through 641. The dose limit setting processing extends from lines 700 through 728. The decay time-to-go processing extends from lines 800 through 852. The processing from line 900 through 996 comprise system sub-routines providing functions used by the processing already mentioned.

Figure 12:
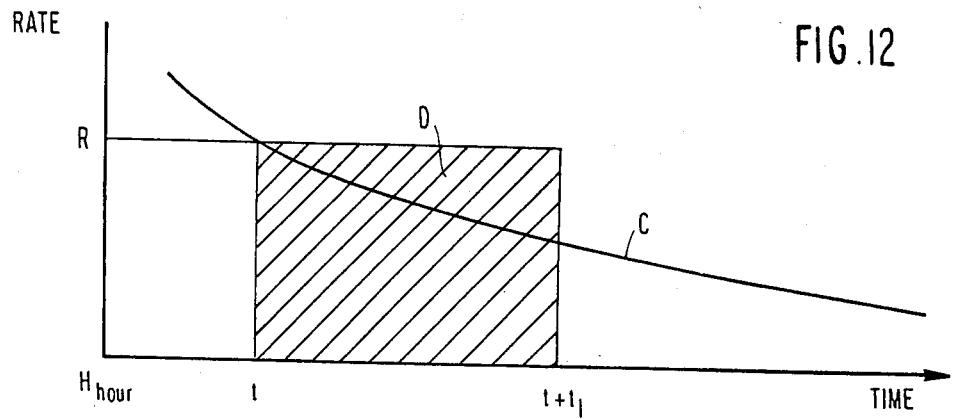
FIG. 12 is useful in explaining time-to-go calculation.

Before describing the software processing in detail, an explanation of the theoretical background, and the algorithms employed is desirable. FIG. 12 illustrates a typical radiation curve C, wherein rate decreases as a function of time.

RATE, DOSE AND TIME-TO-GO (TTG)

In general, we are presented with a problem wherein a user has a dose $D_t$ at a time t and is being exposed to radiation at a rate R. The user has an associated dose limit ($D_L$) which may be determined by a variety of factors, safety being one of them. Of primary importance to the user is a real time (continuous) calculation of the time-to-go (TTG) until the specified dose limit is reached. This calculation is most important when short term dose accumulations are of concern such as those occurring during a single task. Since, in most cases, the radioactive decay will not be significant over a short time, the calculation of time-to-go can be done by simple linear division. This has the added advantage of being a faster computation to perform than one involving calculating the integral of the decaying radiation rate. Furthermore, the calculation will be conservative in that it will somewhat underestimate the amount of time remaining. Also, to smooth the effects of the statistical fluctuations typical of radioactivity, the rate actually employed in the calculations is the average of the current and past three readings and each reading corresponds to approximately 2.5 seconds sample time. Referring now to FIG. 12, t corresponds to the elapsed time since H-hour, the time at which the radiation field was created, $t_1$ is the time-to-go, R is the rate at time t (averaged as described) and the dose D is the user's dose limit ($D_L$) less the dose already accumulated $D_t$. Those skilled in the art will appreciate that D is actually the area under the curve C bound by t and $t+t_1$, but for the reasons expressed above, we will employ the crosshatched area as the dose D. We let $\Delta$ equal the time between rate readings, and then we can write:

$$R = (R(t) + R(t-\Delta) + R(t-2\Delta) + R(t-3\Delta))/4. \tag{1}$$

The apparatus keeps track of the fractional dose such that:

$$D_t = D_t^I + D_t^F, \tag{2}$$

where
$D_t^I$ = integer dose, and
$D_t^F$ = fractional dose.

Since the device is an integer system, a scaling factor is associated with $D_t^F$. Let $\gamma$ equal the scaling factor such that:

$$D_t^F = D_t^f/\gamma. \tag{3}$$

The TTG is desired in hours and minutes, the exposure rate is measured in Roentgens per hour (R/hr), so that, if the rate is R(R/Hr), the rate in R/min is R/60: R(R/Hr) = R/60(R/min). (Note that we follow the convention for gamma radiation that for practical purposes, dose can be given in terms of Roentgens, although technically, the proper unit is the rad.)

Finally:

$$TTG = D/R = \frac{60(D_L - D_t^I) - (60/\gamma)D_t^f}{R}. \tag{4}$$

Radioactivity is indicated by counts from the counter, which is proportional to the radiation rate. The scaling factor $\gamma$ thus takes into account the calibration of the detector. Since the sample time is 2.5 seconds, $\gamma$ also includes a factor of 2.5 to get R per hour. (It should be noted that the calibration scaling factor will be different for each device and has not been explicitly shown in the software of Appendix A.) The count, after scaling for calibration, is added directly to the current dose ($D_t$) without the need to scale for sample time. Thus, the device measures R, and stores $D_t$ (in the form of $D_t^I$ and $D_t^f$) so TTG can be readily calculated, once the user enters $D_L$. Once TTG is calculated in minutes, it is trivial to convert the result to hours and minutes, or even days, hours and minutes.

Because of the memory and calculational speed limitations of the microprocessor used in the preferred embodiment, a series of tables of useful values were developed and programmed into the microprocessor so that they could be looked up rather than calculated when needed. It is useful to describe these before discussing the other functions.

USE OF TABLES

The radiation rate (for example, due to a nuclear explosion) decays with time according to:

$$R(t) = I_1 t^{-1.2} \tag{5}$$

where $I_1$ is the radiation rate one hour after H-hour.
If R is known at time t, then $I_1 = Rt^{1.2}$.
The dose accumulated in the interval between time t and $t + t_1$ is:

$$D = 5Rt^{1.2}(t^{-0.2} - (t+t_1)^{-0.2}), \tag{6}$$

where
t = elapsed time since H hour (in hours),
$t_1$ = accumulation time (in hours).
If we let $t_1 = at$, then we can write:

$$D = 5Rt(1 - (a+1)^{-0.2}). \tag{7}$$

If we let $A = 1 - (a+1)^{-0.2}$, then $D = 5RtA$. \hfill (8)

If a and the corresponding A are tabulated, then solutions for D or $t_1$ involve basic operations with linear terms. Since the range of a value required is longer than can be stored in one byte, it is necessary to include a separate table of multiplying factors. Also to achieve good accuracy it is useful to scale by a factor of 10. The stored numbers a' and M are set so that a' * M = 10 * a, according to the following rule:

$a < 1 \rightarrow M = 1, a' = 10* a,$ $1 \leq a \leq 255 \rightarrow M + 10, a' = a,$ $a > 255 \rightarrow M = 100, a' = a/10.$ Also, for the sake of accuracy, values of the scaled quantity B = 100 * A are stored, rather than A itself.

There are thus three tables, a', M, and B. At this point the primes will be dropped from the notation, for convenience sake.

For the first opportunity (FOP) calculation it is necessary to include another set of lookup tables:

$$R_1' = R_1(t^{1.2}/t_1^{1.2}). \tag{9}$$

Let $t_1 = at$, then $$R_1' = R_1/a^{1.2}. \tag{10}$$

In the FOP calculation, $a^{1.2}$ is solved for, then converted to a via the tables. As before, a multiplication table is included to improve accuracy. Three tables are required, therefore:
a1-table = table of a,
a12-table = table of corresponding $a^{1.2}$, and
m1-table = multiplication table.

$$a1(i)*M1(i) = 10*a, \tag{11}$$

$$a12(i)*M1(i) = 10*a^{1.2}. \tag{12}$$

EXPECTED DOSE (EXDOSE)

In the expected dose calculation, the user again has a dose $D_t$, and the question to be answered is what will his total dose be if he stays in an area currently having a radiation rate R, for a time $T_1$? In this calculation, the dose to be calculated does take into account that the radioactivity will be decaying during the time $t_1$. Thus, it is suitable for long term calculations.

For this problem we use the following parameters:

R = the current rate,
t = the elapsed time since H hour,
$t_1$ = the stay time rate, and
D = the accumulated dose during the stay time $t_1$.

The dose accumulated in the stay time (referring to the previous discussion) is 5atB/100, where B corresponds to the value of $a = t_1/t$. The solution is derived from the tables by interpolation.

First, find i such that:

$$M(i)*a(i) < 10*a < M(i+1)*a(i+1). \quad (15)$$

$$\rightarrow B(i) < B < B(i+1). \quad (16)$$

Define: (linear interpolation)

$$\delta_t = 10*a - M(i)*a(i), \quad (17)$$

$$\delta_a = M(+1)*a(i+1) - M(i)*a(i), \quad (18)$$

$$\delta_B = B(i+1) - B(i). \quad (19)$$

$$B = B(i) + \delta_B \delta_t / \delta_a. \quad (20)$$

$$EXDOSE = 5RtB/100 + D_t = RtB/20 + D_t. \quad (21)$$

Limitations:
If B = 0 due to integer division and input data then the calculation reverts to a linear approximation:

$$EXDOSE = Rt_1.$$

This occurs when $t_1/t < 0.1$.

DECAYED TIME-TO-GO (DECTTG)

Figure 13:
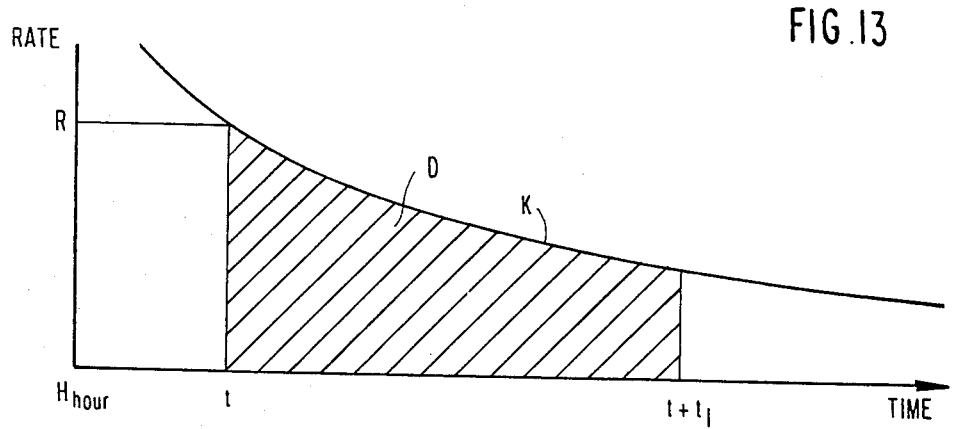
FIG. 13 is useful in explaining expected dose calculation.

In this function, we again assume that a user has a dose $D_t$. He also has assigned a dose limit $D_L$ which assures his well-being. The question to be answered is how much time can elapse before his total dose equals $D_L$ given the current radiation rate, R. This is called the decayed time-to-go mode (DECTTG) because unlike the TTG calculation, it does take into account that R will be decaying. Thus, like EXDOSE, it is meant as a long-term calculation. Referring now to FIG. 13, the curve K illustrates the radiation rate over time. This curve is defined for example by the specific rate R at the time t after H hour. The time $t_1$ is the unknown decayed time-to-go. The cross-hatched area D under the curve of FIG. 13 is the difference between $D_L$ and $D_t$, that is, the incremental dose that is acceptable.

We define:
R = current rate,
t = elapsed time since H-hour,
$t_1$ = DECTTG,
$D = D_L - D_t$ = incremental dose to reach $D_L$.

From earlier discussion, we know that $$D = 5Rt^{1.2}(t^{-0.2} - (t+t_1)^{-0.2}), \quad (22)$$

and $$100D = 5RtB \quad (23)$$

or, $$B = 100D/5Rt.$$

Again, the solution is derived from the tables by interpolation.
Find i such that:

$$B(i) < B < B(i+1) \quad (24)$$

$$\rightarrow M(i)*a(i) < 10*a < M(i+1)*a(i+1). \quad (25)$$

Define: (linear interpolation)

$$\delta_t = B - B(i), \quad (26)$$

$$\delta_B = B(i+1) - B(i), \quad (27)$$

$$\delta_a = M(i+1)a(i+1) - M(i)a(i). \quad (28)$$

Thus:

$$10*a = M(i)a(i) + \delta_a \delta_t / \delta_B. \quad (29)$$

$$t_1 = (10*a*t)/10. \quad (30)$$

Limitations:
If 10 * a = 0 due to integer division and input data then the calculation reverts to a linear approximation:

$$D = Rt_1 \rightarrow t_1 = D/R. \quad (31)$$

This occurs when $t_1/t < 0.1$.

FIRST OPPORTUNITY

Figure 14:
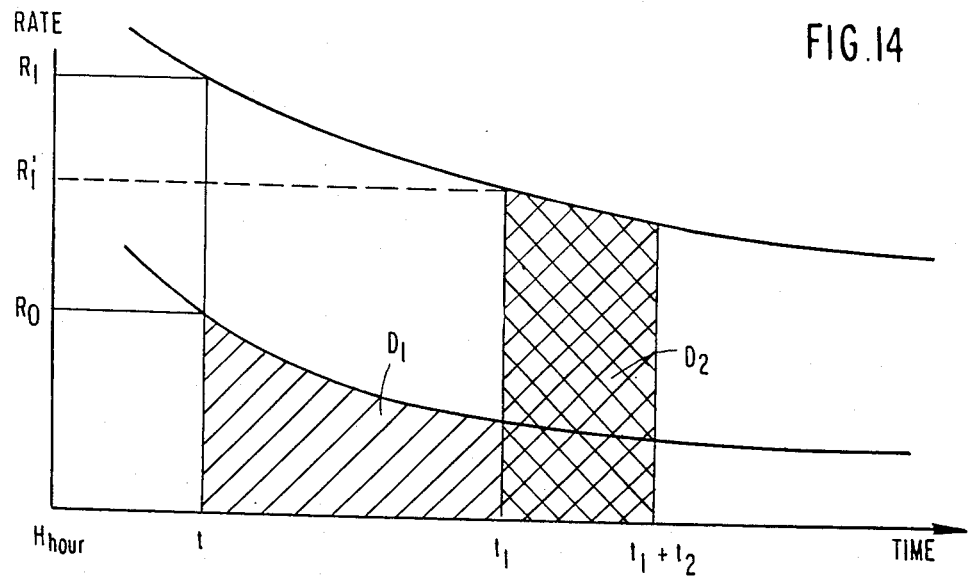
FIG. 14 is useful in explaining first opportunity and decayed time-to-go calculation.

In the first opportunity calculation the user again currently has a dose $D_t$. During the execution of a task the user is willing to receive an additional dose $D_2$. However, the current rate is too high. Thus, by the time the user could complete the task his additional dose would exceed $D_2$. Therefore, he must wait until the radioactivity has decayed. The question to be answered is what is the earliest time that the user can begin this task and receive an additional dose less than or equal to the specified amount. This time is the first opportunity (FOP). Referring now to FIG. 14:

$R_0$ is the current shelter rate (the radiation rate encountered during the wait period),
$R_1$ is the current rate in the task area,
t is the current elapsed time since H-hour,
$t_1 = t + FOP$ is the time that will have elapsed since H-hour at the beginning of the task,
FOP is the time between the current time t and the time $t_1$,
$t_2$ is the task duration.
$D_1$ is the dose that would be accumulated in the shelter between time t and time $t_1 + t_2$ if the user did not perform the task,
$D_2$ is the acceptable additional dose to be accumulated during the task.

Then:

$$D_1 = 5R_0 t^{1.2}(t^{-0.2} - (t_1 + t_2)^{-0.2}). \quad (32)$$

$$D_2 = 5(R_1 - R_0)t^{1.2}(t_1^{0.2} - (t_1 + t_2)^{-0.2}). \quad (33)$$

Let $I_1$ be the H+1 dose rate for the work area.

$$I_1 = R_1 t^{1.2}. \quad (34)$$

Let $R_1'$ be the work area rate at $t_1$.

$$R_1' = I_1 t_1^{-1.2} = R_1(t^{1.2}/t_1^{1.2}). \quad (35)$$

Similarly, $$R_0' = R_0(t^{1.2}/t_1^{1.2}). \quad (36)$$

Equation 33 is solved for $t_1$ for linear interpolation. If $t_1$ is less than t, then the task can be performed immediately with the additional dose less than or equal to D. $D_1$ is then found from an EXDOSE calculation with the rate $R_0$ and stay time $t_1+t_2-t$. The final dose at task completion is $D_1+D$. Note D may be lower than the allowed value if $t_1$ is less than t.

At $t_1$, $R_0$ and $R_1$ have reduced to:

$$R_0' = R_0(t^{1.2}/t_1^{1.2}) \quad (37)$$
$$= R_0/a^{1.2}$$

$$R_1' = R_1(t^{1.2}/t_1^{1.2}) \quad (38)$$
$$= R_1/a^{1.2}$$

Linear Approximation to $D_2$:

$$D_2 = R_1't_2 - R_0't_2 = [(R_1-R_0)t_2]/a12 \quad (39)$$

$$10*a12 = [10(R_1-R_0)t_2]/D_2 \quad (40)$$

Find i such that:

$$a12(i)*M1(i) < 10*a12 < a12(i+1)*M1(i+1) \quad (41)$$

Define: (linear interpolation)

$$\delta_t = 10*a12 - a12(i)*M1(i) \quad (42)$$

$$\delta a_{12} = a12(i+1)*M1(i+1) - a12(i)*M1(i) \quad (43)$$

$$\delta_{a1} = a1(i+1)*M1(i+1) - a1(i)*M1(i) \quad (44)$$

$$a_1 = a1(i)*M1(i) + \delta_t\delta_{a1}/\delta_{a12} \quad (45)$$

$$t_1 = a1t/10 \quad (46)$$

$$FOP = t_1 - t \quad (47)$$

If $$t_1 \leq t, FOP = 0, D_2 = MIN(D_2, (R_1-R_0)t_2). \quad (48)$$

$D_1$ is found as stated in the overview.
Dose at task completion = $D_1 + D_2$.

RAM ASSIGNMENTS

Table I, reproduced directly below, identifies the RAM assignments, and is of assistance in reading the program listings in the Appendix.

TABLE I

RAM Assignment, 2K Local RAM

| Beginning Address | Final Address | Use |
|---|---|---|
| 3A00 | 3A80 | Temporary storage of strings, data |
| 3A81 | 3A84 | Default TTG filter |
| 3A85 | 3A9F | Temporary storage of strings, data |
| 3AA0 | 3AAF | a-Table Values |
| 3AB0 | 3ABF | B-Table Values |
| 3AC0 | 3ACF | M-Table Values |
| 3AD0 | 3ADF | a1-Table Values |
| 3AE0 | 3AEF | a12-Table Values |
| 3AF0 | 3AFF | M1-Table Values |
| 3B00 | | Operation in progress pointer |
| 3B01 | | |
| 3B02 | | |
| 3B03 | | Value read in from keyboard |
| 3B04 | | Interrupt vector |
| 3B05 | | Last blip count |
| 3B06 | | |

TABLE I-continued

RAM Assignment, 2K Local RAM

| Beginning Address | Final Address | Use | |
|---|---|---|---|
| 3B07 | | | |
| 3B08 | | Elapsed time, hours] | (FIG. 2, |
| 3B09 | | Elapsed time, 25 seconds] | 20-9 |
| 3B0A | | Elapsed time, 2.5 seconds] | |
| 3B0B | | Total (Delta) blips | |
| 3B0C | | Blip sample cycle #, default TTG filter | |
| 3B0D | | | |
| 3B0E | | Display update control, currently #6A ≧ cursor disabled | |
| 3B0F | | Display update starting position, currently 0 | |
| 3B10 | 3B2F | Display characters | |
| 3B30 | 3B4F | Flashing display characters | |
| 3B50 | 3B57 | Total dose, default display, 3 char | (FIG. 2, 20-1) |
| 3B58 | 3B5F | Rate, default display, 3 char | (FIG. 2, 20-2) |
| 3B60 | 3B67 | | |
| 3B68 | 3B6F | Dose, alarm display, 3 char | (FIG. 2, 20-5) |
| 3B70 | 3B77 | Rate, alarm display, 3 char | (FIG. 2, 20-6) |
| 3B78 | 3B7F | Hr (2), min (2), TTG, alarm display, 4 char | (FIG. 2, 20-7) |
| 3B80 | 3B87 | Dose limit, doslim display, 3 char | (FIG. 2, 20-3) |
| 3B88 | 3B8F | Days (2), hours (2), Hhour display, 4 char | (FIG. 2, 20-8) |
| 3B90 | 3B97 | Work area rate, FOP display, 3 char | |
| 3B98 | 3B9F | Task dose, FOP display, 3 char | |
| 3BA0 | 3BA7 | Task duration, FOP display, 2 char | |
| 3BA8 | 3BAF | | |
| 3BB0 | 3BB7 | Rate, Xdose display, 3 char | |
| 3BB8 | 3BBF | Stay time, Xdose display, 4 char | |
| 3BC0 | 3BC7 | | |
| 3BC8 | 3BCF | Rate, DECTTG display, 3 char | |
| 3BD0 | 3BD7 | Dose limit, DECTTG display, 3 char | |
| 3BD8 | 3BDF | | |
| 3BE0 | 3BE7 | Shelter rate, FOP Display, 3 char | |
| 3BE8 | 3BEF | | |
| 3BF0 | 3BF7 | | |
| 3BF8 | 3BFF | | |

Table II, reproduced below, indicates the meaning of different variables used in the Appendix, and the location at which they are stored.

TABLE II

Variable Assignments, 2K Local RAM

| Variable | LSB | MSB | Status | Use |
|---|---|---|---|---|
| A | 3800 | 3801 | T | |
| B | 3802 | 3803 | T | |
| C | 3804 | 3805 | T | |
| D | 3806 | 3807 | T | |
| E | 3808 | 3809 | P | Total dose |
| F | 380A | 380B | P | Current rate |
| G | 380C | 380D | P | Alarm dose |
| H | 380E | 380F | T | |
| I | 3810 | 3811 | P | Alarm rate |
| J | 3812 | 3813 | P | Alarm TTG |
| K | 3814 | 3815 | P | Dose limit |
| L | 3816 | 3817 | P | Cursor position, 1 to 32 64 ≧ cursor/numeric entry display |
| M | 3818 | 3819 | P | # of multiple function key depressions |
| N | 381A | 381B | P | Fractional total dose (1/3600 R) |
| O | 381C | 381D | P | Work area rate, FOP |
| P | 381E | 381F | P | Task duration, FOP |
| Q | 3820 | 3821 | P | Accumulation time, Xdose |
| R | 3822 | 3823 | P | Shelter rate, FOP |
| S | 3824 | 3825 | T | |
| T | 3826 | 3827 | T | |

TABLE II-continued

| Variable Assignments, 2K Local RAM | | | | |
|---|---|---|---|---|
| Variable | LSB | MSB | Status | Use |
| U | 3828 | 3829 | L | Rate, DECTTG, rate, Xdose |
| V | 382A | 382B | L | DOS LIM, DECTTG; task dose, FOP |
| W | 382C | 382D | P | No activity time out |
| X | 382E | 382F | T | |
| Y | 3830 | 3831 | T | |
| Z | 3832 | 3833 | T | |

T = temporary, other routines will use and redefine
L = limited permanence, EXEC and CLKINT cannot redefine it
P = permanent, always represents the same data item

OPERATION OF THE PROGRAM

After power-up and initialization (lines 2–39) the machine is in a wait state, from which it is interrupted by either clock or key interrupt. Clock interrupts are used to up-date total dose and radiation rate readings via the counter or can be used to terminate functions which the operator has begun but has not completed. Finally, the machine is also interrupted for operator key depressions.

Reviewing first the clock interrupts, these are detected at line 92 and cause a jump to line 120. At lines 120 and following, the counter is implemented, at line 136 the counter is added to the fractional radiation dose value. This sum is tested at line 137 and if the fractional dose value is over unity, the total dose is incremented and the fractional dose is reset. Line 137 implements a division by 3600, which is an appropriate scaling facor that was employed in an embodiment actually constructed. This scaling factor is appropriate for demonstration purposes since it gives common values of rate, dose, and TTG from very weak radiation sources which are convenient for demonstration purposes. In actual practice the scaling factor is empirically determined by using standard sources. Line 138 creates the dose characters, and if no other operation is in progress, a jump is made to line 160. At line 160 the radiation rate is calculated. Line 162 sets up the typical (default) display of FIG. 4. Line 162 checks to see if a dose limit has been entered, if no dose limit has been entered then the default display indicates that "limit not set" and the time-to-go calculation can obviously not be completed (therefore there is a jump to line 178). On the other hand, if dose limit had been entered, then there is a jump to line 165. At this point the rate averaging is accomplished and line 166 calculates the average time-to-go. Lines 168–170 creates the minutes and hour characters for time-to-go. At line 178 the dose and rate characters are moved to the register driving the display. At line 188 the quantity F (the computed current rate) is compared to I (the alarm rate). If the current rate exceeds the alarm rate then there is a rate alarm condition. Assuming a dose limit has been set, line 194 compares Z (set equal to the computed time-to-go at line 168) to J (the alarm time-to-go). If computed time-to-go on line 188 (Z) is less than alarm time-to-go, then we are in an alarm condition. Finally, line 196 compares E (total dose up-dated at line 138) to G (alarm dose). If total dose is greater than alarm dose, then we are in a dose alarm condition. Line 197 tests to see if we are in any alarm condition. L is always set=64 before checking alarms; if L≠64 at the end of the check process, then an alarm must have been triggered. If there is no alarm condition, a jump is made to line 143 where the display is driven. On the other hand, if the test at line 197 is not satisfied, then line 198 sets a sound alarm bit and a jump is then made to line 143 to drive the display.

EXPECTED DOSE

As indicated above, one of the functions provided by the invention is the ability to allow the user to enter a rate and a stay time and indicate, as a result of that computation, the expected dose.

When the user manipulates the expected dose key 107, the processing, after identifying the particular key depression skips to line 300. At line 301 a check is made to see if H hour had been set, and if it has not been set then a jump is made to line 970 where the user is prompted to set H-hour information.

If H-hour has been set, or on return from the H hour setting function (initiated by a key depression), line 303 prompts the user to input the expected stay time. The rate initializes to the rate sensed by the device, but if the user so wishes, he may enter an alternate rate for the purpose of the calculation. Lines 305–308 (including a jump to line 950) set up the display indicating the information just entered by the user. Thereafter, processing jumps to line 339. At line 339 the data entered by the user is checked and if all data has not been entered a jump is made back to line 143 to reprompt the user. If all data is correct then line 350 begins the calculation. The substantive calculation is actually contained at line 910 and following where the input variables H (accumulation time) and U (expected rate) are used to compute the variables A (accumulated dose) and S (elapsed time in hours). On computing these values a return is made to line 350 where the accumulated dose (A) is incremented by the total dose (E). At the subroutine at line 930 the values so computed are converted to a character string, and on return processing skips to line 143 to display the resulting information.

FIRST OPPORTUNITY

When the user manipulates the first opportunity key 106 (FIG. 1) and this is detected by the machine, processing is transferred to line 400. At this point a check is made to see if H-hour has been set, and if not a jump is made to line 970 to prompt the user to enter H-hour. As indicated in the Appendix, the user must input the work area rate, the shelter rate (that is the rate to which the user will be subjected in the interval between the present time and that time at which he enters the work area), the task duration, and a dose the user is willing to accept during the course of the task. On the first manipulation the user is prompted for the work area rate. Once entered, this is used at line 403 to initialize the current rate to the user input work area rate. On the second manipulation the user is prompted to input the shelter radiation rate. This is used in line 407 to initialize the shelter rate. After each of the two manipulations, the device actually initializes the display to the detected rate. This is done because it is likely that the user will be in one of the two areas of concern. Thus, we can use the input feature of the other or both areas' rates.

On the third manipulation the user is prompted to input the task duration. At line 414 the user is prompted to input the additional taks dose that he is willing to accept. The substance of the calculation takes place at lines 441 et seq.

DECAYED TIME-TO-GO

Figure 8A:
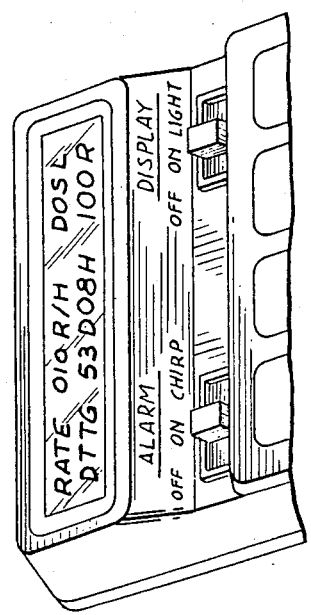

If the user manipulates the decayed time-to-go key 105, then, on recognition of this key depression, processing begins at line 800. At this point a test is made to see if H-hour has been set, and if not the user is prompted to set H-hour. Otherwise, the calculation proceeds immediately and the results are displayed as shown in FIG. 8A. Upon second manipulation of the key, the user is prompted for alternate rate and dose limit, which he may wish to evaluate. See lines 803, 805. Substantive calculation begins at line 833. The result of the calculation is decayed time-to-go in days (A) and hours (Z). Once calculated processing returns to line 143 to provide the user display.

Figure 3B:
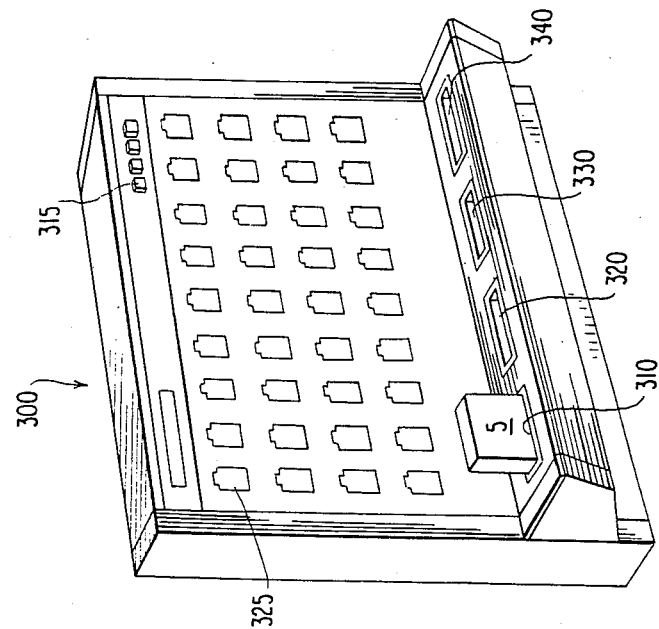
FIGS. 3A and 3B show other components of a total radiation monitoring system based on the invention.
Figure 3A:
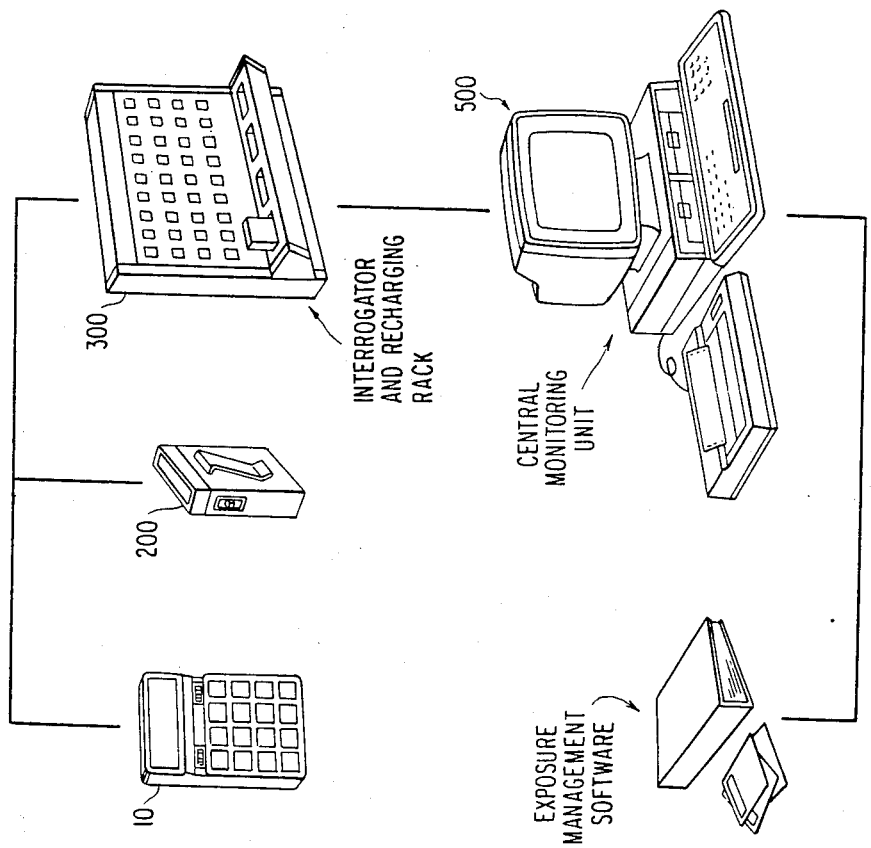

FIGS. 3A and 3B illustrate how the intelligent radiation monitor 10 (or a second embodiment of the radiation monitor 200, which is described below) can be used in a radiation monitoring management system. More particularly, FIG. 3A illustrates that either the radiation monitor 10 or the monitor 200 can be inserted into an interrogator and recharging rack 300 (this is shown in more detail in FIG. 3B). The interrogator and recharging rack provides for two functions, the RAM in either the monitor 10 or monitor 200 can be interrogated or written from a central monitoring unit 500. As will be described below, writing to RAM is most generally used with the monitor 200 (since it does not have its own keyboard). On the other hand, reading from the RAM of the monitors 10 and 200 can be used to accumulate information as to the identity of the particular unit as well as dose information accumulated by the unit to date. This can form the basis for the central monitoring unit 500 in producing statistical records of accumulated dose information over the population of users. FIG. 3B shows the rack 300 in more detail. FIG. 3B illustrates a typical monitor 5 (either 10 or 200) inserted in a slot 310 of the rack 300. The rack may have several such slots (slots 320–340 are also illustrated). Internal to the rack 300 is an RS-232 interface (or equivalent) for coupling information to/from the monitor and the central monitoring unit 500. The rack 300 may also interrogate the power supply internal to the monitor 10 or 200, and provide an indication (by one of the indicators 315) that the battery needs to be replaced. Provision is also made in the rack 300 for a supply of suitable recharged batteries 325. In the event an indicator 315 indicates that a monitor's battery is low, the user can readily remove a recharged battery 325 and replace the depleted battery. The depleted battery can then be placed in the rack 300 for long-term charging. By this technique, the user need only momentarily deposit his monitor (10 or 200) in a slot of the rack, and can quickly replace a depleted battery by a recharged battery. Telltale indicators associated with the battery in the rack indicate whether the battery is charged or charging.

SECOND EMBODIMENT

Figure 11:
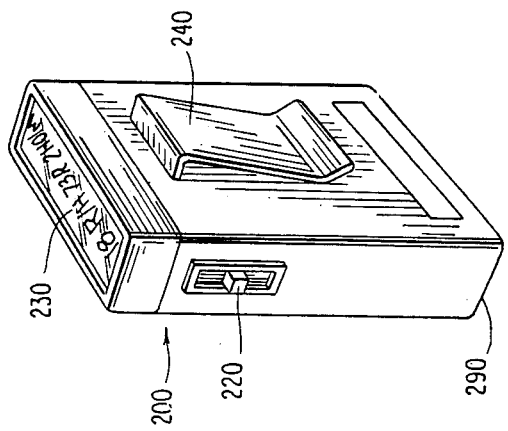
FIG. 11 illustrates the outward appearance of another embodiment of the invention.
Figure 15:
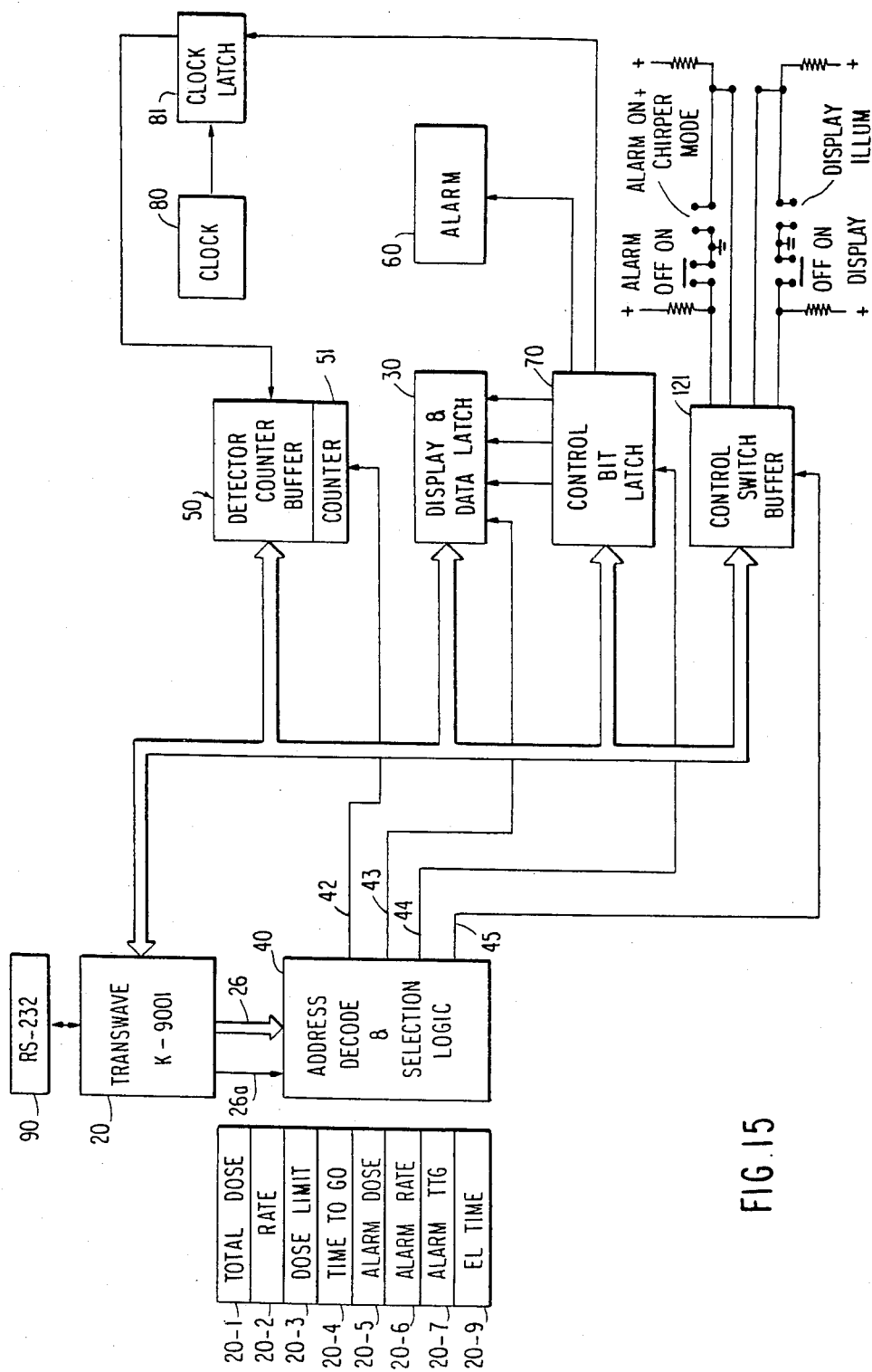
FIG. 15 is a block diagram of the embodiment of FIG. 11.

The intelligent radiation monitor of FIG. 1 includes a keyboard and associated keyboard decode logic buffer for responding to operator inputs. The embodiment shown in FIG. 11 is in many respects similar to the embodiment of FIG. 1 except that it omits the keyboard 100 (and the associated keyboard decode logic buffer 108). In lieu of this apparatus the radiation monitor 200 (of FIG. 11) includes a communication port for receiving information (specifically alarm levels) from an external source of such information. A block diagram of the radiation monitor 200 is shown in FIG. 15. Identical reference characters in FIG. 15 identify apparatus identical to that in FIG. 2. It will be seen that a significant difference between FIGS. 2 and 15 is the absence of the keyboard decode logic buffer 108. In lieu of presentation of alarm information from the keyboard through the keyboard decode logic buffer 108, the embodiment of FIG. 11 employs the RS-232 port 90 to provide alarm information (dose rate and time-to-go) from an external source. Furthermore, in the absence of the keyboard 100, there are other functions that the radiation monitor 200 cannot perform, specifically the decayed time-to-go, FOP and expected dose calculations. Otherwise, the embodiment of FIGS. 1 and 11 are identical.

The RS-232 port 90 (in both the embodiments of FIGS. 1 and 11) can be used to interrogate certain RAM locations of the digital processor 20. More particularly, that port can be used to derive total dose information. By deriving dose information over an extended period of time, a history of the user of the particular radiation monitor 10 or 200 can be built up. Furthermore, by interrogating a plurality of such radiation monitors 10 or 200, over a similar period of time, records can be maintained of radiation dosage for all users of the radiation monitors 10 or 200.

A particular device for either supplying alarm information (rate, dose and time-to-go) to the monitor 200, or a device for interrogating either the monitor 10 or 200, is the central monitoring unit 500 whih can be implemented with a typical personal computer.

```
SMARTBADGE SOFTWARE DEVELOPMENT    SBRTINES
ROUTINE NAME: PWRINT
ABSTRACT:  THIS ROUTINE IS ACCESSED UPON POWERUP.  THE DISPLAY, RAM, LOOK UP TABLES
           AND VARIABLES ARE INITIALIZED.

2 CLEAR:G=999:I=999:N=0:@#3B0C=1:@#E002=#FF      ;reset cpu,zero ram,init ram,init control lines
  :@#3B04=0:@#3A00=#BB                            ;init interrupts,init display
4 @#3A01=#6A:@#3A02=#62:@#3A03=#65:@#3A04=#67    ;initialize display
  :@#3A05=#6B:@#3A06=#8A                          ;
6 @#3A07=#61:@#3A08=#6D:B=#3A00:C=9:GOSUB900     ;send init string to display
8 @#3AA0=0:@#3AA1=3:@#3AA2=8:@#3AA3=17           ;set up a table
  :@#3AA4=30:@#3AA5=49:@#3AA6=76                  ;
9 @#3AA7=142:@#3AA8=211:@#3AA9=31:@#3AAA=67      ;
  :@#3AAB=98:@#3AAC=142                           ;
10 @#3AAD=249                                    ;
11 @#3AAE=36:@#3AAF=60:@#3AB0=0:@#3AB1=5         ;set up B table
   :@#3AB2=11:@#3AB3=18:@#3AB4=24                 ;
```

```
12 @#3AB5=30:@#3AB6=35:@#3AB7=42:@#3AB8=46        ;
   :@#3AB9=50:@#3ABA=57:@#3ABB=60                  ;
14 @#3ABC=63:@#3ABD=67:@#3ABE=69:@#3ABF=72        ;
   :@#3ACE=100:@#3ACF=100                          ;set up M table
16 FORA=0T08:@(#3AC0+A)=1:NEXTA:FORA=0T04         ;
   :@(#3AC9+A)=10:NEXTA                            ;
17 @#3AD0=10:@#3AD1=20:@#3AD2=30:@#3AD3=50        ;set up a1 table
   :@#3AD4=80:@#3AD5=130:@#3AD6=21                 ;
18 @#3AD7=34:@#3AD8=55:@#3AD9=69:@#3ADA=14        ;
   :@#3ADB=23:@#3ADC=37:@#3ADD=40                  ;
19 @#3AE0=10:@#3AE1=23:@#3AE2=37:@#3AE3=69        ;set up a12 table
   :@#3AE4=121:@#3AE5=217                          ;
20 @#3AE7=69:@#3AE8=123:@#3AE9=218:@#3AEA=39      ;
   :@#3AEB=69:@#3AEC=122                           ;
21 @#3AE6=39:@#3AED=133:FORA=0T05:@(#3AF0+A)=1    ;set up M1 table
   :NEXTA                                          ;
22 FORA=0T03:@(#3AF6+A)=10:@(#3AFA+A)=100         ;
   :NEXTA                                          ;
23 FORA=0T063:@(#3B10+A)=#20:NEXTA:FORA=0T0144    ;init character values
   :@(#3B50+A)=#30:NEXTA                           ;
38 @#36A=#31:@#3B72=#31:@#3B00=16:@#3B05=0        ;init opinpro,init blip count
   :@#3B0F=0:G=1:I=1                               ;init display update starting position
39 B=@#E001:@#3B05=@AND#3F:@#3B0E=#6A             ;init blip count to currant blip count,set display control to no cursor
```

SMARTBADGE SOFTWARE DEVELOPMENT    SBRTINES
ROUTINE NAME:  EXECUTIVE
ABSTRACT:   THIS ROUTINE IS THE WAIT STATE FOR INTERRUPTS FROM THE CLOCK OR
            KEYBOARD.

```
90 B=@#E001:A=BAND#C0:IFA=0G090              ;test for interrupts
91 IFA=#40@#3B04=A:G0100                     ;if key,set int flag,jump
92 IFA=#80@#3B04=A:G0120                     ;if clk,set int flag,jump
93 IF@#3B04=#40@#3B04=0:G0120                ;must be double int!!! if already processed key,clr int flag,do clock
94 IF@#3B04=#80@#3B04=0:G0100                ;if already processed clk,clr int flag,do key
95 IF@#3B04=0@#3B04=A:G0121                  ;if this is first process,set int flag,do clock
96 @#3B04=0                                  ;must be second process!!! clr int flag,do key
```

SMARTBADGE SOFTWARE DEVELOPMENT    SBRTINES
ROUTINE NAME:  KEYINT
ABSTRACT:   KEYBOARD INTERRUPT PROCESSING. SINGLE AND MULTIPLE DEPRESSIONS OF FUNCTION KEYS
            PLUS NUMERIC KEYS ARE MONITORED. PROGRAM VECTORING IS DECIDED BASED UPON CURRENT
            (AND PAST) KEYSTROKES.

```
100 A=@#E003:@#E002=#DF:@#E002=#FF:A=AAND#F  ;get key code,clr interrupts
    :B=@#3B00:IFA<>B:G0107                   ;start of key process!!! get new and old key codes, jump if not same
102 M=M+1:IF(A=#A)AND(M<2)G0300              ;increment multiple depression count, jump if XDOSE
103 IF(A=#B)AND(M<5)G0400                    ;jump if FOP
104 IF(A=#F)AND(M<3)G0800                    ;jump if DECTT6
105 IF(A=#D)AND(M<5)G0600                    ;jump if SET ALARMS
106 M=0:@#3B00=16:G090                       ;return to default, reset opinpro, clr mult depression count
107 IF(A>9)AND(A<16)M=0:G0(A#100-700)        ;if first function depression, clr mulp dep count, jump
108 IF(@#3B00=16)OR(L>32)G090                ;if no opinpro or numeric entry disallowed, wait for another interrupt
110 GOSUB980:G0(@#3B00*100-675)              ;save key data, go to appropiate function key processing
```

SMARTBADGE SOFTWARE DEVELOPMENT    SBRTINES
ROUTINE NAME: CLKINT, DISPLAY
ABSTRACT: THIS ROUTINE SAMPLES THE BLIP COUNTER, AND ADDS THE BLIP COUNT TO THE FRACTIONAL RAD VALUE. BLIPS ARE 1/3600
OF A RAD. WHEN THIS FRACTIONAL RAD COUNTER IS 3600, THE TOTAL DOSE IS INCREMENTED. IF ANOTHER ROUTINE IS
IN PROGRESS IT TRANSFER CONTROL. OTHERWISE IT CALCULATES RATE AND TTG, IF THE DOSE LIMIT IS ENTERED, FOR THE
DEFAULT DISPLAY. NOTE THAT THE TTG IS BASED ON THE AVERAGE OVER THE CURRENT RATE AND THE THREE PRECEEDING
READINGS. THE VALUES ARE CHECKED FOR ALARM EXCEEDANCES, AND IF SO THE ALARM IS SOUNDED, AND DISPLAY FLASHED.
DISPLAY IS A ROUTINE BEGINNING AT LINE 143 WHICH DISPLAYS WITH OR WITHOUT A BLINKING CURSOR.

```
120 @#E002=#DF:@#E002=#FF                        ;clr interrupts
121 B=BAND#3F                                    ;isolate blip count
123 @#3B0C=@#3B0C+1:@#3B0A=@#3B0A+1              ;incr clk int count,incr elapsed time
    :IF@#3B0A=10@#3B0A=0:@#3B09=@#3B09+1         ;default processing is 2.5 seconds ergo 1440 cycles/hour,over 10 cycles?
124 IF@#3B09=144@#3B09=0:@#3B0B=@#3B0B+1         ;if over 144 (times 10) cycles, incr elapsed hour location
130 IF@#3B0C=5@#3B0C=1                           ;if fifth sample of blip count, set pointer to 1
132 A=B:B=@#E001:B=BAND#3F:IFA<>B60132           ;sample until two blip counts are equal (prevents erroneous readings!)
134 A=64-@#3B05+B:IFA>63A=A-64                   ;get counts since last reading, remember counter rolls over
136 @#3B0B=A:@(#3A81+@#3B0C-1)=A:@#3B05=B:N=N+A  ;save blip count (rate) in filter bins,add blips to frac rad value
137 IFN>3600E=E+1:N=N-3600                       ;if frac rad value is over one, increment total dose, reset frac rad value
138 A=E:B=#3B50:C=3:GOSUB930                     ;create dose characters
140 IF@#3B00=16G0160                             ;jump in no opinpro
141 W=W+1:IFW>20@#3B00=16:W=0:G0160              ;incr time out count,if timed out,clr opinpro,put up default display
142 G090                                         ;don't update display since nothing has changed
143 B=#3B0E:C=34:GOSUB900:@#3A03=#61:@#3A01=#6B  ;enter here from fcn key processing!!! send display data with controls
    :@#3A02=#6D                                  ;set up display mode data
148 @#3A00=L-1:IFL=64@#3A03=#60:@#3A01=#6A       ;if cursor position = 64, do not show cursor
    :@#3A00=0                                    ;
149 IF@#3B00=16@#3A02=#6C                        ;if in default display, set cursor type to block
150 B=#3A00:C=4:GOSUB900:G090                    ;send mode data to display, wait for interrupts
160 A=@#3B0B*10/25:F=A:C=3:B=#3B58:GOSUB930      ;get rate,divide by default process time (L),create rate char
162 $#3B10="RATE     R/H DOSETIME   H  M    R"   ;set up default display
    :IFK<>0G0165                                 ;jump if dose limit has been entered
164 $#3B20="LIMITNOTSET":@#3B2B=#20:G0178        ;indicate dose limit not set and skip ttg calculation
165 S=(@#3AB1+@#3AB2+@#3AB3+@#3AB4)*10/25        ;add four blip counts
    :IFS=0S=9999:G0168                           ;if zero, set ttg to max and skip calculation
166 S=4*(60*(K-E)-N/60)/S:IFS<0S=0               ;get average ttg, no negative times please
168 Z=S:A=MOD(S,60):S=S/60:B=#3B28:C=2:GOSUB930  ;create ttg minutes character
170 A=S:B=#3B25:C=2:GOSUB930                     ;create ttg hours character
178 A=#3B50:B=#3B2C:C=3:GOSUB950:A=#3B58         ;move dose char to display char
    :B=#3B15:GOSUB950                            ;move rate char to display char
188 L=64:IFF>=1L=1                               ;init to no alarm conditions, rate alarm cond?
192 IFK=0G0196                                   ;jump if dose limit not set
194 IFZ<=JL=17                                   ;ttg alarm cond?
196 IFE>=GL=13                                   ;dose alarm cond?
197 IFL=64G0143                                  ;if no alarm condition,clr sound alarm bit,jump
198 @#E002=#EF:G0143                             ;set sound alarm bit,jump
```

SMARTBADGE SOFTWARE DEVELOPMENT    SBRTINES
ROUTINE NAME: XDOSE
ABSTRACT: THIS ROUTINE ALLOWS THE USER TO ENTER A RATE AND ACCUMULATION
PERIOD (STAY TIME), THEN RETURNS THE EXPECTED DOSE.

```
300 W=0:@#3B00=10:IFK<>0G0305                    ;clr timeout, set opinpro, jump if not first depression
301 L=64:A=#3B9B:C=4:GOSUB955:IFB=0G0970         ;set no cursor mode, get h hour,if h hour = 0, jump
303 $#3B10="INPUT STAY TIME & EXPECTED RATE "    ;prompt user
304 G0143                                        ;display
305 L=22:U=F:A=#3B58:B=#3B80:C=3:GOSUB950        ;set cursor position, init rate to current rate
306 $#3B10="RATE    R/H XDOSSTAY   D  H    R"    ;set up display
    :A=#3B80:B=#3B15:C=3                         ;create rate characters
308 GOSUB950:A=#3B89:B=#3B25:C=2:GOSUB950        ;create stay time day characters
    :A=#3BBA:B=#3B28:GOSUB950                    ;create stay time hour characters
310 G0339                                        ;jump to calculation
```

SMARTBADGE SOFTWARE DEVELOPMENT    SBRTINES
ROUTINE NAME: XDOSE1
ABSTRACT: THIS ROUTINE PROCESSES USER DATA INPUT FOR THE EXPECTED DOSE
          FUNCTION.

```
325 IFL<9X=#3BB0+L-6                           ;is it rate?
327 IF(L)21)AND(L<24)X=#3BB8+L-22              ;is it stay time day?
328 IFL)24X=#3BB8+L-23                         ;is it stay time hour?
329 GOSUB995:C=3:IF(A=#3BB8)C=2                ;save key entry,disable cursor,get char base address,incr cursor position
331 GOSUB955:IFL<1060338                       ;get new value,jump if not stay time
333 Q=B*24:A=#3B6A:C=2:GOSUB955:Q=Q+B          ;convert days into hours, get stay time hours,get total hours
    :IFL=24L=25                                ;repo cursor
336 IFL=27L=6                                  ;
337 60339                                      ;jump to calculation
338 U=B:IFL=9L=22                              ;set rate, repo cursor
339 IF(L<)6)AND(L<)22)60143                    ;jump if only partial data item has been entered
350 H=0:GOSUB910:A=A+E:B=#3B2C:C=3:GOSUB930    ;jump to calculation subroutine,get total xdose,create xdose characters
    :60143                                     ;display
```

SMARTBADGE SOFTWARE DEVELOPMENT    SBRTINES
ROUTINE NAME: FOP
ABSTRACT: THIS ROUTINE ACCEPTS USER INPUTS FOR WORK AREA RATE, SHELTER RATE, TASK DURATION, AND ADDITIONAL RECEIVED
          DOSE DURING TASK, THEN RETURNS THE FIRST OPPORTUNITY TO PERFORM TASK PLUS THE TOTAL DOSE AT TASK COMPLETION.

```
400 @#3B00=11:W=0:A=#3BB8:C=4:GOSUB955         ;set opinpro, clr timeout,get h-hour
    :IFB=060970                                ;jump if h-hour = 0
401 GO(402+M*4)                                ;jump based on # of depressions
402 ##3B10="INPUT WORK AREA RATE      R/HR"    ;set up display prompt for work area rate
403 G=F:A=#3B58:B=#3B90:C=3:GOSUB950           ;init work area rate to current rate
404 L=26:A=#3B90:B=#3B29:C=3:GOSUB950:60143    ;
406 ##3B10="INPUT SHELTER   RATE      R/HR"    ;display
407 R=F:A=#3B58:B=#3BE0:C=3:GOSUB950           ;set up display prompt for shelter rate
408 L=26:A=#3BE0:B=#3B29:C=3:GOSUB950:60143    ;init shelter rate to current rate
410 ##3B10="INPUT TASK      DURATION    HR"    ;
411 L=29:A=#3BA0:B=#3B2C:C=2:GOSUB950:60143    ;display
414 ##3B10="INPUT ADDITIONALTASK DOSE    R"    ;set up display prompt for task duration
415 L=29:A=#3B98:B=#3B2C:C=3:GOSUB950:60143    ;init to last task duration entry
418 ##3B10="FIRST OP    D HFINAL DOSE    R"    ;display
    :60441                                     ;set up display prompt for allowable received dose during task
415 @#3B02=29:A=#3B98:B=#3B2C:C=3:GOSUB950     ;init to last task dose entry
    :60143                                     ;display
419 ##3B10="FIRST OPP   D HFINAL DOSE    R"    ;init output display
    :60441                                     ;jump to calculation
```

SMARTBADGE SOFTWARE DEVELOPMENT    SBRTINES
ROUTINE NAME: SETHHR
ABSTRACT: THIS ROUTINE PROMPTS THE USER TO ENTER WHEN THE ATTACK OCCURED
          SO THAT PREDICTIVE CALUCLATIONS CAN BE PERFORMED.

```
500 L=24:@#3B00=12:W=0                         ;init cursor position, set opinpro,clr timeout
    :##3B10="INPUT TIME SINCEATTACK   DAY HR"  ;init display
501 A=#3B68:C=2:GOSUB955:Z=B*24:A=#3B6A:C=2    ;correct for improper entry (01D25H -> 02D01H)! get day characters
    :GOSUB955:Z=Z+B:A=MOD(Z,24)                ;get hour characters,get total hours,A=days
504 B=#3B2A:C=2:GOSUB930:A=Z/24:B=#3B8         ;A=hours
    :GOSUB930:A=#3B8B:B=#3B27:C=2              ;
506 GOSUB950:A=#3B6A:B=#3B2C:GOSUB950          ;
    :60143                                     ;display
```

SMARTBADGE SOFTWARE DEVELOPMENT    SBRTINES
ROUTINE NAME: SETHHR1
ABSTRACT: THIS ROUTINE PROCESSES THE USER INPUT FOR WHEN THE ATTACK
          OCCURED.

```
525 IFL<26X=#3B6B+L-24:GO527              ;day character?
526 X=#3B6A+L-29                          ;hour character?
527 GOSUB995:C=2:GOSUB955:S=B:A=#3B6A:C=2  ;save key entry,disable cursor,get char base address,incr cursor position
    :GOSUB955                              ;get days,get hours
531 @#3B08=S*24+B:@#3B09=0:@#3B0A=0        ;set elapsed hours,zero other elapsed time counters
532 IFL=26L=29                             ;repo cursor
533 IFL=31L=24                             ;
534 GO143                                  ;display
```

SMARTBADGE SOFTWARE DEVELOPMENT    SBRTINES
ROUTINE NAME: ALMSET
ABSTRACT: THIS ROUTINE PROCESSES THE USER INPUT FOR DOSE, RATE, AND TTG
          ALARM VALUES.

```
600 @#3B00=13:W=0                          ;set opinprc, clr timeout
601 IF(M<>0)AND(M<>4)#3B10="INPUT ALARM LEVEL" ;if input display, set up top 16 characters, jump
    :GO608                                 ;
602 L=64:##3B10=                           ;set display mode to no cursor,disable numeric entry
    "ALRM LEVELS    R  R/HR    H  M":A=#3B70 ;set up alarm status display
604 B=#3B20:C=3:GOSUB950:A=#3B68:B=#3B1C   ;get rate alarm
    :GOSUB950:A=#3B78:B=#3B28              ;get dose alarm
606 C=1:GOSUB950:A=#3B7A:B=#3B2D:C=2:GOSUB950 ;get ttg alarm hours,get ttg alarm minutes
    :GO143                                 ;display
608 IFM<>1GO611                            ;jump if not dose alarm prompt
609 @#3B20="DOSE    R        ":L=22:A=#3B68 ;set up display,position cursor
    :B=#3B25:C=3:GOSUB950                  ;get dose
610 GO143                                  ;display
611 IFM<>2GO614                            ;jump if not rate alarm prompt
612 ##3B20="RATE    R/HR     ":L=22:A=#3B70 ;set up display,position cursor
    :B=#3B25:C=3:GOSUB950                  ;get rate
613 GO143                                  ;display
614 ##3B20="TIME-TO-GO  H  M":A=MOD(J,60)  ;set up display for ttg alarm,A=ttg minutes
    :B=#3B7A:C=2:GOSUB950:A=J/60           ;create minutes characters,A=ttg hours
616 B=#3B78:C=1:GOSUB950:A=#3B78:B=#3B2B:C=1 ;create hours characters,note that this is done to correct improper entrys
    :GOSUB950:L=28                         ;move hours to display field,position cursor
618 A=#3B7A:B=#3B2D:C=2:GOSUB950:GO143     ;move minutes to display field,display
```

SMARTBADGE SOFTWARE DEVELOPMENT    SBRTINES
ROUTINE NAME: ALMSET1
ABSTRACT: THIS ROUTINE PROCESSES THE USER INPUT FOR DOSE, RATE, AND TTG
          ALARM VALUES.

```
625 IFM=1X=#3B68+L-22                      ;was it dose
626 IFM=2X=#3B70+L-22                      ;was it rate
627 IF(M=3)AND(L<29)X=#3B78                ;was it ttg hours
628 IF(M=3)AND(L)29)X=#3B7A+L-30           ;was it ttg minutes
629 GOSUB995:C=3:IF(A=#3B78)C=1            ;save key entry,disable cursor,get char base address,incr cursor position
631 GOSUB955:IFA>#3B70GO635                ;get new value,jump if not dose
633 S=B:IFL=25L=22                         ;set alarm dose,repo cursor
634 GO143                                  ;display
635 IFA>#3B78GO636                         ;jump if not rate
636 I=B:IFL=25L=22                         ;set alarm rate,repo cursor
637 GO143                                  ;display
638 S=B:A=#3B7A:C=2:GOSUB955:IFL=29L=30    ;save ttg hours,get ttg minutes
640 IFL=32L=28                             ;repo cursor
641 J=60*S+B:GO143                         ;save ttg minutes
```

SMARTBADGE SOFTWARE DEVELOPMENT    SBRTINES
ROUTINE NAME:  DOSLIM
ABSTRACT:  THIS ROUTINE PROMPTS THE USER TO ENTER A DOSE LIMIT. THIS IS
           USED TO CALCULATE TTG IN THE DEFAULT DISPLAY.

```
700 L=27:@#3B00=14:W=0                          ;set cursor position,set opinpro,clr timeout
    :#3B10="INPUT MAX ALLOW-ABLE DOSE    R "    ;initialize display
701 A=#3B80:B=#3B2A:C=3:GOSUB950:GO143          ;move dose limit to display location
```

SMARTBADGE SOFTWARE DEVELOPMENT    SBRTINES
ROUTINE NAME:  DOSLIM1
ABSTRACT:  THIS ROUTINE PROCESSES A USER DATA INPUT INTO A NEW DOSE
           LIMIT CHARACTER AND VALUE.

```
725 X=L-27+#3B80:GOSUB995:C=3:GOSUB955:K=B      ;save new char,calculate new dose limit
    :IFL=30L=27                                 ;
728 GO143                                       ;save dose limit,repo cursor
```

SMARTBADGE SOFTWARE DEVELOPMENT    SBRTINES
ROUTINE NAME:  DECTTG
ABSTRACT:  THIS ROUTINE PROMPTS THE USER FOR RATE AND DOSE LIMIT THEN
           RETURNS THE DECAYED RATE TTG.

```
800 @#3B00=15:W=0:A=#3B68:C=4:GOSUB955          ;set opinpro, clr timeout,get h-hour
    :IFB=0GO970                                 ;jump in h-hour not set
801 IF M<>1GO805                                ;jump in not second depression
803 L=64:$#3B10=                                ;set cursor off,numeric entry disabled
    "INPUT EXPECTED  RATE & DOSELIMIT":GO143    ;set up prompt display,display
805 #3B10="RATE    R/H DOSLOTTG   D  H    R"    ;set up display for input and calculation
    :L=6:U=F:V=K:A=#3B58                        ;position cursor,init rate to current rate,init to current doselimit
807 B=#3BC8:C=3:GOSUB950:A=#3B60:B=#3BD0        ;move characters
    :GOSUB950:A=#3BC8:B=#3B15                   ;move characters to display field
809 GOSUB950:A=#3BD0:B=#3B2C:GOSUB950           ;
    :IFV=0L=29                                  ;if dose limit = 0,init data entry at dose limit
810 GO833                                       ;go to calculation
```

SMARTBADGE SOFTWARE DEVELOPMENT    SBRTINES
ROUTINE NAME:  DECTTG1
ABSTRACT:  THIS ROUTINE PROCESSES USER DATA INPUT FOR THE DECTTG FUNCTION. DURING THE CALCULATION THE VARIABLE D IS
           USED AS A MULTIPLIER. IF B(true) IS LESS THAN ONE, THEN D IS SET TO 10 AND THE CALCULATION USES 10*B IN PLACE
           OF B.

```
825 IFL<9X=#3BC8+L-6                            ;is it rate?
826 IFL>9X=#3BD0+L-29                           ;is it dose?
827 GOSUB995:C=3                                ;save key entry,disable cursor,get char base address,incr cursor position
    :GOSUB955:IFA<#3BD0GO832                    ;get new value,jump if not doselimit
830 V=B:IFL=32L=6                               ;set doselimit,repo cursor
831 GO833                                       ;jump to calculation
832 U=B:IFL=9L=29                               ;set rate,repo cursor
833 IFV<>0GO836                                 ;skip (no jump) calculation if doselimit = 0
834 FORB=0TO4                                   ;loop
835 IF(#3B25+B)<>#3B27@(#3B25+B)=#2A            ;insert ** for ttg in display
836 NEXTB                                       ;end loop
837 GO143                                       ;display
838 IF(L<>6)AND(L<>29)GO143                     ;skip calculation if entire data field not entered
839 GOSUB975:D=1:X=0:IFU=0T=2399:GO851          ;get elapsed time,init X to 0,init D to 1,if rate=0 set ttg to max
841 Z=20*D*(V-E)/U/S:IF(Z=0)AND(D=1)D=10:GO841  ;Z=true B value,if Z < 1 try again with D=10
843 DO:X=X+1:Y=D*@(#3AB0+X):UNTIL(Y)Z)OR(X=16)  ;find which entries (X,X-1) in the B table where B true falls between
    :IFX=16T=2399:GO851                         ;if B true is larger than the last table entry, set ttg to max
844 A=D*@(#3AB0+X-1):Z=Z-A:Y=Y-A                ;A=B(x-1),Z=B(true) - B(x-1),Y=B(x) - B(x-1),A=a(x-1)
    :A=@(#3AA0+X-1)*@(#3AC0+X-1)                ;note that the a table is multiplied by the M table to get 10*a
845 X=@(#3AA0+X)*@(#3AC0+X)-A                   ;X=a(x) - a(x-1) otherwise
846 A=A+X*Z/Y:T=A*5/10:IFT=0T=(V-E)/U           ;A=10*a(true),T=ttg in hours,if T=0, use linear calculation
851 Z=MOD(T,24):A=T/24                          ;Z=ttg in hours,A=ttg in days
852 B=#3B25:C=2:GOSUB930:A=Z:B=#3B28:C=2        ;create characters and move to display field
    :GOSUB930:GO143                             ;display
```

SMART BADGE SOFTWARE DEVELOPMENT      SBSUBS
ROUTINE NAME:  DSTRS
ABSTRACT:  SENDS A STRING OF COMMANDS TO DISPLAY
VARIABLES INPUT:   B = STARTING ADDRESS
                   C = STRING LENGTH
VARIABLES USED:  D
VARIABLES DESTROYED:  D

```
900 @#E002=#BF                              ;set CS low
901 FORD=0TOC-1                             ;
902 @#E000=@(B+D):@#E002=#3F:@#E002=#BF     ;loop
903 NEXTD                                   ;send data to display, toggle WR
904 @#E002=#FF:RETURN                       ;set CS high
```

SMART BADGE SOFTWARE DEVELOPMENT      SBSUBS
ROUTINE NAME:  XDOSESUB
ABSTRACT:  CALCULATES ACCUMULATED DOSE OVER A PERIOD STARTING FROM THE CURRENT TIME.  THE RATE AND ACCUMUATION TIME
           ARE INPUT.  THIS METHOD USES A TABLE LOOKUP TECHNIQUE TO MODEL THE DECAY PROCESS.  NOTE THAT TO INCLUDE USEFUL
           RANGE OF a-TABLE VALUES, AND KNOWING THAT THE IMPORTANT ITEM IS 10*a, an M-TABLE IS INCLUDED SUCH THAT
           10 * a = a(i) * M(i).  SEE NOTES ON CALCULATIONS FOR DETAILS
VARIABLES INPUT:   H = ACCUMULATION TIME
                   U = RATE
VARIABLES USED:  B,C,X,Y,Z
VARIABLES OUTPUT:  A = ACCUMULATED DOSE
                   S = ELAPSED TIME IN HOURS
VARIABLES DESTROYED:  B,C,X,Y,Z

```
910 IF(H=0)OR(U=0)A=0:RETURN                 ;if accumulation time or rate = 0, dose = 0 and return
911 GOSUB975:A=10*H:IF(A/S)=0A=0:GOTO913     ;get elapsed time,if a(true)<.1 then go linear (indirectly: 10*a=0 => B=0)
912 A=A/S+2*MOD(A,S)/S:IFA=>6000A=6000:Y=6000;A=10*a(true),if a(true) is beyond the table, set it to the max
    .:X=15:GOTO914                           ;
913 X=0:DO:X=X+1:Y=@(#3AA0+X)*@(#3AC0+X)     ;find table indices (x,x-1) where a(true) is between,mult a(i) by M(i)
    :UNTIL(Y>A)                              ;
914 B=@(#3AA0+X-1)*@(#3AC0+X-1):C=A-B:Y=Y-B  ;B=a(x-1)*10,C=a(true) - a(x-1),Y=a(x) - a(x-1)
    :B=@(#3AB0+X-1)                          ;B=B(x-1),Z=B(x) - B(x-1)
916 Z=@(#3AB0+X)-B:B=B+Z*C/Y:IFB=0A=H*U:RETURN ;B=B(true),if B=0 (can get any info from tables) use linear calculation
917 B=B*U:IFS>(32767/B)A=999:RETURN          ;if dose over max, set = max
918 A=B*S/20:RETURN                          ;A=accumulated dose
```

SMART BADGE SOFTWARE DEVELOPMENT      SBSUBS
ROUTINE NAME:  INTCHAR
ABSTRACT:  CONVERTS AN INTEGER TO A CHARACTER STRING
VARIABLES INPUT:   A = INTEGER
                   B = STARTING ADDRESS OF STRING
                   C = NUMBER OF CHARACTERS
VARIABLES USED:  D,H
VARIABLES DESTROYED:  A,D,H
VARIABLES OUTPUT:  NONE

```
930 D=1                                      ;init max value
931 FORH=1TOC                                ;loop
932 D=D*10                                   ;get max value
933 NEXTH                                    ;
934 IF(A<0)OR(A=>D)A=D-1                     ;force string to be less than max value, if negative set = to max - 1
936 H=B+C-1                                  ;set up init char add, 1's digit
937 FORD=HTOBSTEP-1                          ;loop
938 @D=MOD(A,10)+48:A=A/10                   ;save char
939 NEXTD                                    ;
940 RETURN                                   ;
```

SMART BADGE SOFTWARE DEVELOPMENT      SBSUBS
ROUTINE NAME: MOVSTR
ABSTRACT: MOVES A STRING IN RAM
VARIABLES INPUT:  A = BEGINNING ADDRESS OF SOURCE
                  B = BEGINNING ADDRESS OF DESTINATION
                  C = STRING LENGTH
VARIABLES USED: D
VARIABLES DESTROYED: D
VARIABLES OUTPUT: NONE

```
950 FORD=0TOC-1                        ;loop
951 @(B+D)=@(A+D)                      ;move char
952 NEXTD                              ;
953 RETURN                             ;
```

SMART BADGE SOFTWARE DEVELOPMENT      SBSUBS
ROUTINE NAME: CHARINT
ABSTRACT: CONVERTS A CHARACTER STRING TO AN INTEGER
VARIABLES INPUT:  A = STARTING ADDRESS OF STRING
                  C = NUMBER OF CHARACTERS
VARIABLES USED: D,H
VARIABLES DESTROYED: A,C,D,H
VARIABLES OUTPUT: B = INTEGER RESULT

```
955 B=0:D=1:IFC=1GO960                 ;init integer,init muliplier,if only one character skip loop
957 FORH=1TOC-1                        ;loop
958 D=D*10                             ;get multiplier
959 NEXTH                              ;
960 DO                                 ;loop
961 B=B+(@A-48)*D:A=A+1:C=C-1:D=D/10   ;add char val * mult to integer,next char,next multiplier
962 UNTILC=0                           ;
963 RETURN                             ;
```

SMART BADGE SOFTWARE DEVELOPMENT      SBSUBS
ROUTINE NAME: SHHMSG
ABSTRACT: DISPLAYS SET H HOUR IF FOP, XDOSE, OR DECTTG IS REQUESTED
          AND H-HOUR HAS NOT BEEN ENTERED.
          ***NOTE THIS ROUTINE IS ACCESSED BY GO, NOT GOSUB***
VARIABLES INPUT: NONE
VARIABLES USED: W
VARIABLES DESTROYED: W
VARIABLES OUTPUT: NONE

```
970 L=64:@#3B00=17                     ;disable cursor and numeric entry,set opinpro
    :$#3B10="SET H-HOUR"               ;set up display
974 W=0:GO143                          ;clr timeout,display
```

SMART BADGE SOFTWARE DEVELOPMENT      SBSUBS
ROUTINE NAME: ELAPHR
ABSTRACT: RETURNS THE ELAPSED HOURS FROM #3B06-#3B0A
VARIABLES INPUT: NONE
VARIABLES USED: NONE
VARIABLES OUTPUT: S = HOURS ELAPSED

```
975 S=@#3B08:IF@#3B09>72S=S+1          ;get elapsed hours,if cycles>720 then incr elapsed hours
976 RETURN                             ;(note: default processing takes 2.5s. # cycles/hour=1440)
```

```
SMART BADGE SOFTWARE DEVELOPMENT    SBSUBS
ROUTINE NAME: KEYSAV
ABSTRACT: SAVES KEY VALUE IN DISPC AND FDISPC.
VARIABLES INPUT: A = KEY CODE READ IN
VARIABLES USED: NONE
VARIABLES DESTROYED: A
VARIABLES OUTPUT: NONE

980 @#3603=A:@(L-1+#3B10)=A+48          ;save kybd entry in display location
981 RETURN                              ;

SMART BADGE SOFTWARE DEVELOPMENT    SBSUBS
ROUTINE NAME: KEYPROCESS
ABSTRACT: PERFORMS SEVERAL FUNCTIONS RELATED TO PROCESSING A KEY FUNCTION: REPLACE OLD NUMERIC CHARACTER WITH NEW
         NUMERIC CHARACTER IN RAM, TURN OFF CURSOR AND PUT NEW CHARACTER IN DISPLAY, FIND BASE (STARTING) ADDRESS
         IN RAM FOR CHARACTER STORE OF DATA VALUE AFFECTED, INCREMENT CURSOR POSITION
VARIABLES INPUT: X = RAM ADDRESS OF INDIVIDUAL CHARACTER AFFECTED
                @#3B03 = MOST RECENT KEY CODE
VARIABLES USED: B,C,D,W
VARIABLES DESTROYED: B,C,D,W
VARIABLES OUTPUT: A = BASE ADDRESS FOR CHARACTER STORE OF DATA VALUE AFFECTED

995 @X=@#3B03+48:@#3A00=#6A:@#3A01=@X:B=#3A00    ;replace character,display new character with cursor disabled
    :C=2:GOSUB900                                ;
996 A=X/8+8:W=0:L=L+1:RETURN                     ;get base address,clr timeout,increment cursor position
```

I claim:

1. A personal radiation monitor comprising:
a radiation detector producing rate information related to real time radiation exposure rate to which said radiation detector is exposed,
a digital processor responsive to said radiation detector for integrating said rate information to maintain total dose information,
output means responsive to information provided by said digital processor for providing a manifestation of at least said rate and total dose information,
said digital processor including:
first means for repeatedly comparing said total dose information to dose limit information to produce dose-to-go information related to the difference between said total dose information and the dose limit information,
second means for, repeatedly, dividing said dose-to-go information by said rate information to produce and thereafter update time-to-go information related to time-to-go for the user to reach said dose limit, and
third means for controlling said output means for providing a manifestation of said updated time-to-go information.

2. The apparatus of claim 1 which further includes:
keyboard means responsive to user information and providing output signals indicative thereof,
said digital processor responsive to said output signals to derive said dose limit information.

3. The apparatus of claim 2 in which said digital processor further includes:
fourth means for comparing said time-to-go information with alarm time-to-go information and for providing an alarm signal to said output means when said time-to-go information is less than said alarm time-to-go information.

4. The apparatus of claim 3 in which said output means includes a visually perceptible display for said rate, total dose and time-to-go information and an audible signalling device operated by said alarm signal.

5. The apparatus of claim 3 in which said digital processor further includes:
means for storing an alarm rate,
fifth means for comparing said rate information with said alarm rate and for producing a rate alarm signal to said output means to operate an audible signal producing device if said rate information exceeds said alarm rate.

6. The apparatus of claim 3 in which said digital processor further includes:
fifth means for producing a dose alarm signal to said output means to operate an audible signal producing device if said total dose information exceeds alarm dose information.

7. The apparatus of claim 1 which further includes:
transceiver means responsive to an external source of information and providing output signals indicative thereof, and responsive to said digital processor for transmitting information signals to an external information sink,
said digital processor responsive to said output signals to derive said dose limit information.

8. The apparatus of claim 7 in which said digital processor further includes:
fourth means for comparing said time-to-go information with alarm time-to-go information and for providing an alarm signal to said output means when said time-to-go information is less than said alarm time-to-go information.

9. The apparatus of claim 8 in which said output means includes a visually perceptible display for said rate, total dose, and time-to-go information and an audible signalling device operated by said alarm signal.

10. The apparatus of claim 8 in which said digital processor includes:
means for storing an alarm rate,
fifth means for comparing said rate information with said alarm rate and for producing a rate alarm signal to said output means to operate an audible signal producing device if said rate information exceeds said alarm rate.

11. The apparatus of claim 8 in which said digital processor further includes:
fifth means for producing a dose alarm signal to said output means to operate an audible signal producing device if said total dose information exceeds alarm dose information.

12. A personal radiation monitor comprising:

a radiation detector producing rate information related to real time radiation exposure rate to which said radiation detector is exposed, a digital processor responsive to said radiation detector for sensing and integrating said rate information to maintain total dose information, said digital processor including first means for storing a time parameter and at least one parameter indicative of a prevailing radiation decay rate, said digital processor including second means for determining, based on said prevailing radiation decay rate, predicted dose information for a selected time in the future representing a dose that would be accumulated by a user exposed to prevailing radiation for the selected time, equal to said stored time parameter, said digital processor further includes means to sum said total dose information with said predicted dose information, and output means responsive to information provided by said digital processor for providing a manifestation of at least said sum of said predicted dose information and said total dose information.

13. The apparatus of claim 12 in which:

said digital processor further includes third means for repeatedly comparing said total dose information to dose limit information to produce updated dose-to-go information related to the difference between said total dose information and the dose limit information, fourth means for dividing said updated dose-to-go information by said rate information to produce updated time-to-go information related to time-to-go for the user to reach said dose limit, and fifth means for controlling said output means for providing a manifestation of said updated time-to-go information.

14. The apparatus of claim 13 which further includes:

keyboard means responsive to user information and providing output signals indicative thereof, said digital processor responsive to said output signals to derive said dose limit information.

15. The apparatus of claim 14 in which said digital processor further includes:

sixth means for comparing said time-to-go information with alarm time-to-go information and for providing an alarm signal to said output means when said time-to-go information is less than said alarm time-to-go information.

16. The apparatus of claim 13 which further includes:

receiver means responsive to an external source of information and providing output signals indicative thereof, said digital processor responsive to said output signals to derive said dose limit information.

17. A personal radiation monitor comprising:

a radiation detector producing rate information related to real time radiation exposure rate to which said radiation detector is exposed, a digital processor responsive to said radiation detector for sensing said rate information, said digital processor including first means for storing a time parameter and at least one parameter indicative of a prevailing radiation decay rate, as well as a work area rate and a work dose parameter, said digital processor including second means for determining a sum of:

(a) a first predicted dose based on said prevailing exposure rate and decay rate and an initially unknown time parameter, (b) said work dose parameter, said second means including means for determining said unknown time parameter by equating said work dose parameter to a calculated dose based on said time parameter and a work area rate equal to said stored work area rate but modified by said unknown time.

18. A personal radiation monitor comprising:

a radiation detector producing rate information related to real time radiation exposure rate to which said radiation detector is exposed, a digital processor responsive to said radiation detector for sensing and integrating said rate information to thereby maintain total dose information, said digital processor including first means for storing a selected radiation dose limit parameter and at least one additional parameter indicative of radiation decay, said digital processor including second means for determining, based on predictable radiation decay, a predicted time at which an accumulated dose, equal to said stored dose limit parameter, will be reached, said second means including means for obtaining a difference between said dose limit parameter and said total dose information and predicting said predicted time based on said difference, and output means responsive to information provided by said digital processor for providing a manifestation of at least said predicted time information.

19. The apparatus of claim 18 in which:

said output means further includes default display means responsive to information provided by said digital processor for providing a manifestation of at least said rate and total dose information, said digital processor further including:

third means for comparing, in real time, said total dose information to dose limit information to produce real time dose-to-go information related to the difference between said total dose information and the dose limit information, fourth means for dividing said real time dose-to-go information by said rate information to produce real time, time-to-go information related to time-to-go for the user to reach said dose limit, and fifth means for controlling said output means for providing a manisfestation of said real time, time-to-go information.

20. The apparatus of claim 19 which further includes:

keyboard means responsive to user information and providing output signals indicative thereof, said digital processor responsive to said output signals to derive said dose limit information.

21. The apparatus of claim 19 which further includes:

receiver means responsive to an external source of information and providing output signals indicative thereof, said digital processor responsive to said output signals to derive said dose limit information.

22. The apparatus of any of claims 1, 13, 17 or 19 wherein:

said digital processor includes means for protecting said total dose information from manipulation by an operator or user.

* * * * *